(12) United States Patent
Ishizaki

(10) Patent No.: US 7,536,549 B2
(45) Date of Patent: May 19, 2009

(54) METHODS FOR GENERATING A PARTIALLY ENCRYPTED AND COMPRESSED DATABASE AND DECRYPTING AND DECOMPRESSING THE DATABASE

(76) Inventor: Toshikazu Ishizaki, c/o Japan Information Technology Co., Ltd., Shoko Bldg. 5th floor, 10, Jinbocho 3-chome, Kanda, Chiyoda-ku, Tokyo (JP)

( * ) Notice: Subject to any disclaimer, the term of this patent is extended or adjusted under 35 U.S.C. 154(b) by 731 days.

(21) Appl. No.: 09/798,946

(22) Filed: Mar. 6, 2001

(65) Prior Publication Data
US 2002/0019934 A1   Feb. 14, 2002

(30) Foreign Application Priority Data
Aug. 10, 2000   (JP)   ............... 2000-243042

(51) Int. Cl.
*H04L 9/00*   (2006.01)
*G06F 17/30*   (2006.01)
(52) U.S. Cl. ................. 713/167; 713/164; 707/1; 707/2; 707/9; 707/100; 707/101
(58) Field of Classification Search ............. 713/200, 713/201; 380/277, 278, 259
See application file for complete search history.

(56) References Cited

U.S. PATENT DOCUMENTS

| 5,504,818 | A |   | 4/1996 | Okano |   |
|---|---|---|---|---|---|
| 6,011,849 | A | * | 1/2000 | Orrin | ............. 380/42 |
| 6,023,694 | A | * | 2/2000 | Kouchi et al. | ............. 707/2 |
| 6,052,780 | A | * | 4/2000 | Glover | ............. 713/193 |
| 6,516,324 | B1 | * | 2/2003 | Jones et al. | ............. 707/104.1 |
| 6,915,289 | B1 | * | 7/2005 | Malloy et al. | ............. 707/2 |
| 6,931,532 | B1 | * | 8/2005 | Davis et al. | ............. 713/167 |

FOREIGN PATENT DOCUMENTS

| EP | 1089194 A2 | 4/2001 |
|---|---|---|
| JP | 11-341566 | 12/1999 |
| JP | 2000-078023 | 3/2000 |

OTHER PUBLICATIONS

"The Authoritative Dictionary of IEEE Standards Terms, Seventh Edition", p. 268, copyright: 2000.*
Kuan et al, "xml-dev-Tag for every column in every row", pp. 1-2, copyright 2000, printed: Jan. 8, 2009.*

* cited by examiner

*Primary Examiner*—Ponnoreay Pich
(74) *Attorney, Agent, or Firm*—Day Pitney LLP

(57) ABSTRACT

It is an object of the present invention to provide encryption and decryption apparatuses capable of selecting a part of file portions handled on a computer, and encrypting and decrypting only the thus selected part of file portions. The encryption apparatus 200 and the decryption apparatus 300 can encrypt and decrypt all of item data elements in item data portions in specified association with a specific item name portion of the database 400 while maintaining reciprocal relationships among the item data portions in the database 400 regardless of whether item data elements in the item data portions are encrypted or not. This leads to the fact that major features of the database such as data search and data alignment functions remain enabled even if item data elements in item data portions of the database are encrypted.

2 Claims, 21 Drawing Sheets

FIG. 3
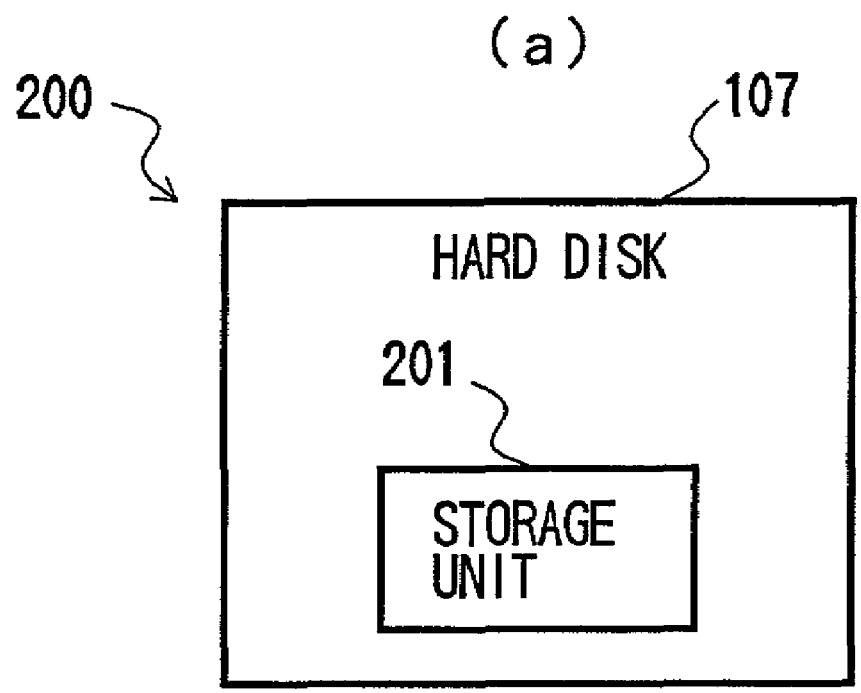
(a)
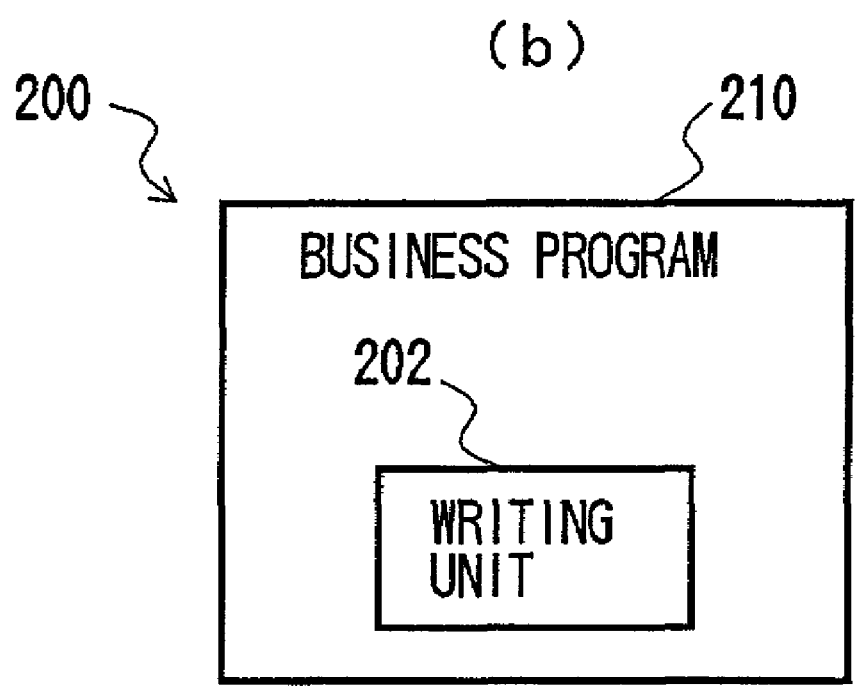
(b)

F I G. 5
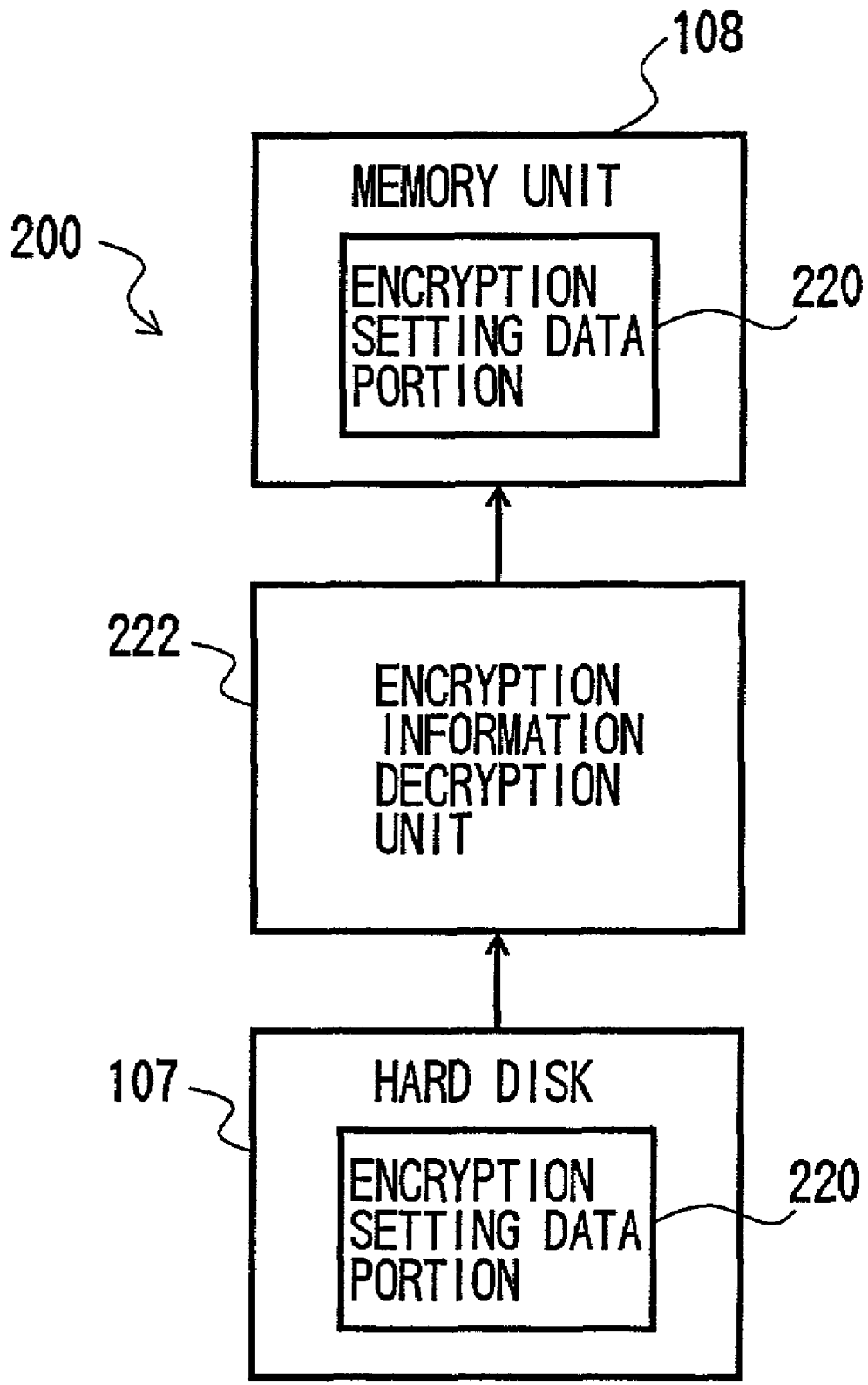

FIG. 7
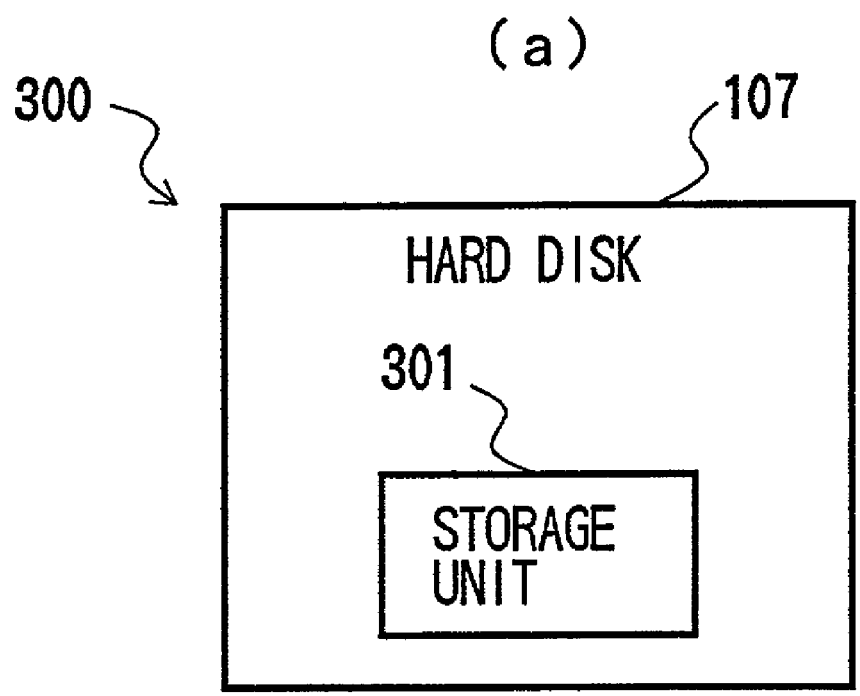
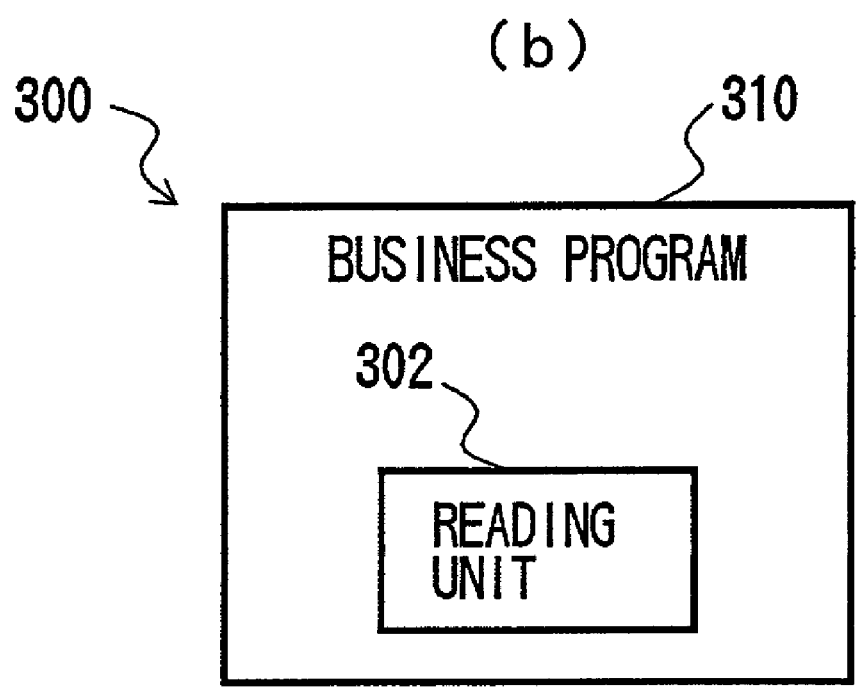

FIG. 11

DATABASE — 400, 410

PERSONAL DATA TABLE

| REGISTRATION No. | NAME | ADDRESS | TELEPHONE No. | BIRTH DATE |
|---|---|---|---|---|
| 1 | Allen | Portland, NY | 03-3123-4567 | 1960/04/01 |
| 2 | Winograd | Oakland, CA | 048-234-5678 | 1970/05/23 |
| 3 | Schafer | Morristown, NJ | 045-345-6789 | 1975/08/17 |
| 4 | Heidegger | New York, NY | 043-456-7890 | 1966/10/05 |
| 5 | Bennett | Honolulu, HI | 026-567-8901 | 1953/02/19 |
| 6 | Checkland | Denver, CO | 027-679-0123 | 1980/09/28 |
| 7 | Harper | Little Rock, AR | 028-789-3456 | 1969/12/28 |

CARD DATA TABLE — 420

| REGISTRATION No. | NAME | CREDIT CARD COMPANY | CARD No. | EXPIRATION DATE |
|---|---|---|---|---|
| 1 | Allen | ABC | 123 | 00/09 |
| 2 | Winograd | DEF | 456 | 00/12 |
| 3 | Schafer | GHI | 789 | 01/05 |
| 4 | Heidegger | ABC | 190 | 02/06 |
| 5 | Bennett | DEF | 367 | 02/08 |
| 6 | Bennett | ABC | 876 | 01/10 |
| 7 | Checkland | KLM | 432 | 02/06 |
| 8 | Harper | ABC | 987 | 00/12 |
| 9 | Harper | KLM | 328 | 03/01 |

FIG. 12

DATABASE 400

PERSONAL DATA TABLE 410

| REGISTRATION No. | NAME | ADDRESS | TELEPHONE No. | BIRTH DATE |
|---|---|---|---|---|
| 1 | Allen | Portland, NY | ndoqheqbmpq | 1960/04/01 |
| 2 | Winograd | Oakland, CA | wo74hnfqnwfg | 1970/05/23 |
| 3 | Schafer | Morristown, NJ | eqwlow8ehfnc | 1975/08/17 |
| 4 | Heidegger | New York, NY | p;ekifjcewin | 1966/10/05 |
| 5 | Bennett | Honolulu, HI | cnbfouwecdfe | 1953/02/19 |
| 6 | Checkland | Denver, CO | we0ufjejmiech | 1980/09/28 |
| 7 | Harper | Little Rock, AR | wq98hdcwecn | 1969/12/28 |

CARD DATA TABLE 420

| REGISTRATION No. | NAME | CREDIT CARD COMPANY | CARD No. | EXPIRATION DATE |
|---|---|---|---|---|
| 1 | Allen | ABC | 8hfjewfn | 00/09 |
| 2 | Winograd | DEF | vndojnvc | 00/12 |
| 3 | Schafer | GHI | ddskjdvn | 01/05 |
| 4 | Heidegger | ABC | dlsndkslw | 02/06 |
| 5 | Bennett | DEF | 09wasjiw | 02/08 |
| 6 | Bennett | ABC | mvpww40 | 01/10 |
| 7 | Checkland | KLM | dslonnvw | 02/06 |
| 8 | Harper | ABC | s;mvvvvw | 00/12 |
| 9 | Harper | KLM | qawefk-q1 | 03/01 |

METHODS FOR GENERATING A PARTIALLY ENCRYPTED AND COMPRESSED DATABASE AND DECRYPTING AND DECOMPRESSING THE DATABASE

BACKGROUND OF INVENTION

1. Field of the Invention

The present invention relates to an apparatus, method and computer program product for encrypting and decrypting information data being handled among computers.

2. Description of the Related Art

A computer has so far been utilized within a closed environment such as an office, or a limited local area. In accordance with the development of a computer network system and the diffusion of the Internet technology, the computer is now able to communicate with any other computers located all over the world if a connection is properly established. Any computer user may operate the computer so as to handle with information data being communicated among the computer network system whatever available in the world regardless of where he or she is operating the computer.

The greatest benefit of such computer network system is that any information data can be distributed without regulation. There may be, however, provided confidential matters contained in those information data being distributed among computers. Many of those confidential matters are required to be protected against unauthorized use and tampering by a third party with malice.

A LAN (local area network) is equipped with an access control security called "fire wall" to restrict accesses from outside computers into the LAN network system to a certain degree so as to protect the computer network system from unauthorized accesses.

Although such security is constructed in the LAN, the computer network system is still vulnerable to a third person with malice who slickly attempts to break in the fire wall and steal confidential information data in a manner such as: tapping of data being communicated among computers; penetration by illegally obtaining other person's ID and password, and passing themselves off as if an authorized user with the thus illegally obtained person's ID and password; illegal access via other server; and intrusion through Remote Access Service (RAS), which is a maintenance dedicated line.

Furthermore, a person concerned with and in the know about the security may take out information data or leak secret information data although there is provided a robust security system. In the case, it is impossible to protect information data against unauthorized use or tampering regardless of however robust the security system is. As a matter of fact, it happened that a person in a company committed a crime of sneaking out company's clients' lists and selling them to an agency which commercially deals with the clients' name lists.

Needless to mention that any information data being communicated among computers may be easily leaked out owing to insufficient security called "security hole" unless the computer network system is constantly monitored and maintained.

The number of personal computers constantly connected with a computer network system is steadily growing in accordance with the spread of broadband communication systems lines. It is anticipated that information data being communicated among personal computers will be targeted for unauthorized use or tampering by a third party with malice in the near future.

Conventionally, if a file contains one information data portion that must be treated as confidential, all of the information data portions in the file have been encrypted by an encryption method to guard the confidentiality. Here, "a data portion" means a unit of a data piece in any format being communicated with computers, which will be described hereinlater. "All of information data portions in a file are encrypted" means that all of the information data portions in the file are converted in a certain conversion method so that all of the data portions in the file are virtually undecipherable. For brevity, a file containing one or more data portions will be hereinlater referred to as "a file portion". The thus encrypted file portions are not restored to the original readable state until the encrypted file portions are converted again in a reversed method from the aforesaid conversion method (hereinlater referred to as "decryption").

Accordingly, the confidential matters of the file portions will not be leaked out since the file portions have been encrypted even if the file portions are stolen by a third party with malice. This leads to the fact that the confidentiality of the file is ensured unless the decryption method is leaked.

The conventional encryption and decryption methods, however, require longer time to encrypt or decrypt file portions in accordance with the increase in the size of the file portions because of the fact that the conventional encryption and decryption methods encrypt and decrypt all of the data portions in the file.

Furthermore, the conventional encryption and decryption methods encrypt and decrypt a database, by cutting off reciprocal relationships among data portions since the encryption and decryption methods encrypt all of the data portions in the database. Accordingly, thus encrypted database will be unable to permit a database user to perform a data search function and a data realignment function, which are major features of database.

SUMMARY OF THE INVENTION

In view of the foregoing problems, it is an object of the present invention to provide encryption and decryption apparatuses, methods, and computer program products capable of selectively encrypting and decrypting a part of file portions being handled on a computer, particularly, selectively encrypting and decrypting data portions in specified association with an item name of a database, thereby making it possible to protect against unauthorized use and tampering while major database features are enabled.

In order to solve the above problems, the present invention is provided with the encryption apparatus, comprising: data storage means for storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item data portion not encrypted; encryption item selecting means for selecting item name portion or portions from among a plurality of item name portions belonging to a file portion; and item encryption means for encrypting all of item data elements in item data portion or portions belonging to the non-encrypted item data group in specified association with the item name portion or portions selected by the encryption item selecting means.

In order to solve the above problems, the present invention is provided with the encryption apparatus in which the data block includes two or more file portions, further comprising file selecting means for selecting file portion or portions from among the two or more file portions whereby the encryption item selecting means being operated to select an item name portion or portions from among the file portion or portions selected by the file selecting means.

In order to solve the above problems, the present invention is provided with the encryption apparatus which further comprises: secret key generating means for generating a plurality of secret keys used when all of item data elements in item data portion or portions belonging to the non-encrypted item data group in specified association with the item name portion or portions selected by the encryption item selecting means are encrypted by the item encryption means; and secret key selecting means for selecting one secret key from among a plurality of the secret keys in specified association with each of the item name portion or portions selected by the encryption item selecting means.

In order to solve the above problems, the present invention is provided with the encryption apparatus which further comprises data writing means for writing item data portion or portions each having encrypted item data elements belonging to the encrypted item data group or item data elements belonging to the non-encrypted item data group into the data storage means in accordance with item name portion or portions, whereby the item encryption means is operated to encrypt all of item data elements in item data portion or portions belonging to the non-encrypted item data group in specified association with item name portion or portions selected by the encryption item selecting means, and the data writing means is operated to write all of the encrypted item data elements belonging to the encrypted item data group in place of item data elements belonging to the non-encrypted item data group in the item data portion into the data storage means.

In order to solve the above problems, the present invention is provided with the encryption apparatus which further comprises: item compression means for compressing all of the encrypted item data elements in the item data portion or portions belonging to the encrypted item data group.

In order to solve the above problems, the present invention is provided with the encryption apparatus which further comprises item search means for selecting a search key from among a plurality of item name portions, and searching an item name portion in a file portion on the basis of the search key, the search key being in unique relationship with the item name portion.

In order to solve the above problems, the present invention is provided with the encryption apparatus in which the item search means is operated to select a search key from among a plurality of item name portions belonging to a file portion, and search an item name portion in specified association with an item data portion belonging to the encrypted item data group with all of the item data elements encrypted, in the file portion on the basis of the search key.

In order to solve the above problems, the present invention is provided with the encryption apparatus in which the data block includes two or more file portions, the item search means being operated to select a search key from among a plurality of item name portions belonging to a file portion having at least one item name portion in specified association with an item data portion belonging to the encrypted item data group with all of the item data elements in the item data portion encrypted, and search an item name portion belonging to a file portion other than the file portion on the basis of the search key.

In order to solve the above problems, the present invention is provided with the encryption apparatus in which the data block includes two or more file portions, the item search means being operated to select a search key from among a plurality of item name portions belonging to a file portion, and search an item name portion belonging to another file portion other than the file portion, the another file portion having at least one item name portion in specified association with an item data portion belonging to the encrypted item data group with all of the item data elements in the item data portion encrypted, on the basis of the search key.

In order to solve the above problems, the present invention is provided with the encryption apparatus in which the data block includes two or more file portions, the item search means being operated to select a search key from among a plurality of item name portions, and search an item name portion in the file portions including at least one file portion having at least one item name portion in specified association with an item data portion belonging to the encrypted item data group with all of the item data elements in the item data portion encrypted, on the basis of the search key.

In order to solve the above problems, the present invention is provided with the encryption apparatus in which the data block includes an encryption setting data portion having setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising encryption information encryption means for encrypting all of the setting information data elements in the encryption setting data portion.

In order to solve the above problems, the present invention is provided with the encryption apparatus in which the encryption information encryption means is operated to encrypt all of the setting information data elements in the encryption setting data portion, and store the encryption setting data portion with encrypted setting information data elements in a computer usable storage medium.

In order to solve the above problems, the present invention is provided with the encryption apparatus in which the encryption information encryption means is operated to encrypt all of the setting information data elements in the encryption setting data portion, and stores the encryption setting data portion with encrypted setting information elements in a memory unit.

In order to solve the above problems, the present invention is provided with the encryption apparatus in which the data block includes an encrypted encryption setting data portion having setting information data elements, the setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising encryption information decryption means for decrypting all of the encrypted setting information data elements in the encryption setting data portion in a memory unit, whereby the encryption apparatus is operated to select an item name portion from among a plurality of item name portions in a file and encrypt all of item data elements in an item data portion belonging to the non-encrypted item data group in specified association with the selected item name portion on the basis of the encryption setting data portion.

In order to solve the above problems, the present invention is provided with the encryption apparatus in which the item data portion includes one or more image data elements.

In order to solve the above problems, the present invention is provided with the encryption apparatus in which the item data portion includes one or more audio data elements.

In order to solve the above problems, the present invention is provided with the encryption apparatus in which the file portion includes one or more tables in a database.

In order to solve the above problems, the present invention is provided with a decryption apparatus, comprising: data storage means for storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item data portion not encrypted; decryption item selecting means for selecting item name portion or portions from among a plurality of item name portions belonging to a file portion; and item decryption means for decrypting all of encrypted item data elements in item data portion or portions belonging to the encrypted item data group in specified association with the item name portion or portions selected by the decryption item selecting means.

In order to solve the above problems, the present invention is provided with the decryption apparatus in which the data block includes a plurality of secret keys used when all of encrypted item data elements in item data portion or portions belonging to the encrypted item data group in specified association with the item name portion or portions selected by the decryption item selecting means are decrypted by the item decryption means, and further comprising secret key selecting means for selecting a secret key from among a plurality of the secret keys in specified association with each of the item name portion or portions selected by the decryption item selecting means.

In order to solve the above problems, the present invention is provided with the decryption apparatus which further comprises data reading means for reading item data portion or portions each having encrypted item data elements belonging to the encrypted item data group or item data elements belonging to the non-encrypted item data group from the data storage means in accordance with item name portion or portions, whereby the item decryption means is operated to decrypt all of the encrypted item data elements in item data portion or portions belonging to the encrypted item data group in specified association with item name portion or portions selected by the decryption item selecting means, and the data reading means is operated to read all of the decrypted item data elements belonging to the non-encrypted item data group in place of encrypted item data elements belonging to the encrypted item data group in the item data portion from the data storage means.

In order to solve the above problems, the present invention is provided with the decryption apparatus further comprising item decompression means for decompressing all of compressed encrypted data elements in item data portion or portions in specified association with item name portion or portions selected by the decryption item selecting means, whereby the item decompression means is operated to decompress all of the compressed encrypted data elements in the item data portion or portions in specified association with the item name portion or portions selected by the decryption item selecting means, and the item decryption means being operated to decrypt all of the encrypted data elements decompressed by the item decompression means.

In order to solve the above problems, the present invention is provided with the decryption apparatus in which the data block includes an encrypted decryption setting data portion having encrypted setting information data elements, the setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising decryption information decryption means for decrypting all of the encrypted setting information data elements in the encrypted decryption setting data portion in a memory unit, whereby the decryption apparatus is operated to select an item name portion from among a plurality of item name portions belonging to a file portion on the basis of the setting information data elements decrypted by the decryption information decryption means, and decrypt all of encrypted item data elements in an item data portion belonging to the encrypted item data group in specified association with the selected item name portion.

In order to solve the above problems, the present invention is provided with the decryption apparatus in which the decryption information decryption means is operated to decrypt the encrypted decryption setting data portion stored in the data storage means in a memory unit.

In order to solve the above problems, the present invention is provided with the decryption apparatus in which the decryption information decryption means is operated to decrypt the encrypted decryption setting data portion stored in a memory unit.

In order to solve the above problems, the present invention is provided with the decryption apparatus in which the data block includes a decryption setting data portion having setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising decryption information encryption means for encrypting all of the setting information data elements in the decryption setting data portion.

In order to solve the above problems, the present invention is provided with the decryption apparatus in which the item data portion includes one or more image data portions.

In order to solve the above problems, the present invention is provided with the decryption apparatus in which the item data portion includes one or more audio data portions.

In order to solve the above problems, the present invention is provided with the decryption apparatus in which the file portion includes one or more tables in a database.

In order to solve the above problems, the present invention is provided with the encryption method, comprising: data storage step (a) of storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item data portion not encrypted;

encryption item selecting step (b) of selecting item name portion or portions from among a plurality of item name portions belonging to a file portion; and item encryption step (c) of encrypting all of item data elements in item data portion or portions belonging to the non-encrypted item data group in specified association with the item name portion or portions selected in the encryption item selecting step (b).

In order to solve the above problems, the present invention is provided with the encryption method in which the data storage step (a) has the step of storing two or more file portions, further comprising file selecting step (d) of selecting file portion or portions from among the two or more file portions whereby the encryption item selecting step (b) has the step of selecting an item name portion or portions from among the file portion or portions selected in the file selecting step (d).

In order to solve the above problems, the invention the present invention is provided with the encryption method which further comprises the steps of:

secret key generating step (e) of generating a plurality of secret keys used when all of item data elements in item data portion or portions belonging to the non-encrypted item data group in specified association with the item name portion or portions selected in the encryption item selecting step (b) are encrypted in the item encryption step (c); and secret key selecting step (f) of selecting one secret key from among a plurality of the secret keys in specified association with each of the item name portion or portions selected by the encryption item selecting means.

In order to solve the above problems, the present invention is provided with the encryption method which further comprises the steps of: data writing step (g) of writing item data portion or portions each having encrypted item data elements belonging to the encrypted item data group or item data elements belonging to the non-encrypted item data group into the data storage step (a) in accordance with item name portion or portions, whereby the item encryption step (c) has the step of encrypting all of item data elements in item data portion or portions belonging to the non-encrypted item data group in specified association with item name portion or portions selected in the encryption item selecting step (b), and the data writing step (g) having the step of writing all of the encrypted item data elements belonging to the encrypted item data group in place of item data elements belonging to the non-encrypted item data group in the item data portion into the data storage step (a).

In order to solve the above problems, according to the present invention is provided with the encryption method which further comprises the item compression step (h) of compressing all of the encrypted item data elements in the item data portion or portions belonging to the encrypted item data group.

In order to solve the above problems, the present invention is provided with the encryption method which further comprises the step of:

item search step (i) of selecting a search key from among a plurality of item name portions, and searching an item name portion in a file portion on the basis of the search key, the search key being in unique relationship with the item name portion.

In order to solve the above problems, the present invention is provided with the encryption method in which the item search step (i) has the step of selecting a search key from among a plurality of item name portions belonging to a file portion, and searching an item name portion in specified association with an item data portion belonging to the encrypted item data group with all of the item data elements encrypted, in the file portion on the basis of the search key.

In order to solve the above problems, the present invention is provided with the encryption method in which the data storage step (a) has the step of storing the data block including two or more file portions, the item search step (i) having the step of selecting a search key from among a plurality of item name portions belonging to a file portion having at least one item name portion in specified association with an item data portion belonging to the encrypted item data group with all of the item data elements in the item data portion encrypted, and searching an item name portion belonging to a file portion other than the file portion on the basis of the search key.

In order to solve the above problems, the present invention is provided with the encryption method in which the data storage step (a) having the step of storing the data block including two or more file portions, the item search step (i) having the step of selecting a search key from among a plurality of item name portions belonging to a file portion, and searching an item name portion belonging to another file portion other than the file portion, the another file portion having at least one item name portion in specified association with an item data portion belonging to the encrypted item data group with all of the item data elements in the item data portion encrypted, on the basis of the search key.

In order to solve the above problems, the present invention is provided with the encryption method in which the data storage step (a) having the step of storing the data block including two or more file portions, and the item search step (i) having the step of selecting a search key from among a plurality of item name portions, and searching an item name portion in the file portions including at least one file portion having at least one item name portion in specified association with an item data portion belonging to the encrypted item data group with all of the item data elements in the item data portion encrypted, on the basis of the search key.

In order to solve the above problems, the present invention is provided with the encryption method in which the data storage step (a) having the step of storing the data block including an encryption setting data portion having setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising the encryption information encryption step (j) of encrypting all of the setting information data elements in the encryption setting data portion.

In order to solve the above problems, the present invention is provided with the encryption method in which the encryption information encryption step (j) having the step of encrypting all of the setting information data elements in the encryption setting data portion, and storing the encryption setting data portion with encrypted setting information data elements in a computer usable storage medium.

In order to solve the above problems, the present invention is provided with the encryption method in which the encryption information encryption step (j) having the step of encrypting all of the setting information data elements in the encryption setting data portion, and storing the encryption setting data portion with encrypted setting information elements in a memory unit.

In order to solve the above problems, the present invention is provided with the encryption method in which the data storage step (a) having the step of storing the data block including an encrypted encryption setting data portion having setting information data elements, the setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising the encryption information decryption step (k) of decrypting all of the encrypted setting information data elements in the encryption setting data portion in a memory unit, whereby the encryption method has the step of selecting an item name portion from among a plurality of item name portions in a file and encrypting all of item data elements in an item data portion belonging to the non-encrypted item data group in specified association with the selected item name portion on the basis of the encryption setting data portion.

In order to solve the above problems, the present invention is provided with the encryption method in which the data storage step (a) having the step of storing the item data portion including one or more image data elements.

In order to solve the above problems, the present invention is provided with the encryption method in which the data storage step (a) having the step of storing the item data portion including one or more audio data elements.

In order to solve the above problems, the present invention is provided with the encryption method in which the data storage step (a) having the step of storing the file portion including one or more tables in a database.

In order to solve the above problems, the present invention is provided with the decryption method, comprising: data storage step (m) of storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item 'data portion not encrypted; decryption item selecting step (n) of selecting item name portion or portions from among a plurality of item name portions belonging to a file portion; and item decryption step (o) of decrypting all of encrypted item data elements in item data portion or portions belonging to the encrypted item data group in specified association with the item name portion or portions selected in the decryption item selecting step (n).

In order to solve the above problems, the present invention is provided with the decryption method in which the data storage step (m) having the step of storing the data block including a plurality of secret keys used when all of encrypted item data elements in item data portion or portions belonging to the encrypted item data group in specified association with the item name portion or portions selected in the decryption item selecting step (n) are decrypted in the item decryption step (o), and further comprising the secret key selecting step (p) of selecting a secret key from among a plurality of the secret keys in specified association with each of the item name portion or portions selected in the decryption item selecting step (n).

In order to solve the above problems, the present invention is provided with the decryption method which further comprises the data reading step (q) of reading item data portion or portions each having encrypted item data elements belonging to the encrypted item data group or item data elements belonging to the non-encrypted item data group from the data storage step (m) in accordance with item name portion or portions, whereby the item decryption step (o) has the step of decrypting all of the encrypted item data elements in item data portion or portions belonging to the encrypted item data group in specified association with item name portion or portions selected in the decryption item selecting step (n), and the data reading step (q) of has the step of reading all of the decrypted item data elements belonging to the non-encrypted item data group in place of encrypted item data elements belonging to the encrypted item data group in the item data portion from the data storage step (m).

In order to solve the above problems, the present invention is provided with the decryption method further comprising the item decompression step (r) of decompressing all of compressed encrypted data elements in item data portion or portions in specified association with item name portion or portions selected in the decryption item selecting step (n), whereby the item decompression step (r) has the step of decompressing all of the compressed encrypted data elements in the item data portion or portions in specified association with the item name portion or portions selected in the decryption item selecting step (n), and the item decryption step (o) has the step of decrypting all of the encrypted data elements decompressed in the item decompression step (r).

In order to solve the above problems, the present invention is provided with the decryption method in which the data storage step (m) has the step of storing the data block including an encrypted decryption setting data portion having encrypted setting information data elements, the setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising the decryption information decryption step (s) of decrypting all of the encrypted setting information data elements in the encrypted decryption setting data portion in a memory unit, whereby the decryption method has the steps of selecting an item name portion from among a plurality of item name portions belonging to a file portion on the basis of the setting information data elements decrypted in the decryption information decryption step (s), and decrypting all of encrypted item data elements in an item data portion belonging to the encrypted item data group in specified association with the selected item name portion.

In order to solve the above problems, the present invention is provided with the decryption method in which the decryption information decryption step (s) has the step of decrypting the encrypted decryption setting data portion stored in the data storage step (m) in a memory unit.

In order to solve the above problems, the present invention is provided with the decryption method in which the decryption information decryption step (s) has the step of decrypting the encrypted decryption setting data portion stored in a memory unit.

In order to solve the above problems, the present invention is provided with the decryption method in which the data storage step (m) has the step of storing the data block including a decryption setting data portion having setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising the decryption information encryption step (t) of encrypting all of the setting information data elements in the decryption setting data portion.

In order to solve the above problems, the present invention is provided with the decryption method in which the data storage step (m) has the step of storing the item data portion including one or more image data portions.

In order to solve the above problems, the present invention is provided with the decryption method in which the data storage step (m) has the step of storing the item data portion including one or more audio data portions.

In order to solve the above problems, the present invention is provided with the decryption method in which the data storage step (m) has the step of storing the file portion including one or more tables in a database.

In order to solve the above problems, the present invention is provided with the computer program product comprising a computer usable storage medium having computer readable code embodied therein for encryption, wherein the computer readable code comprising: a data storage program product code (C1) for storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item data portion not encrypted; encryption item selecting program product code (C2) for selecting item name portion or portions from among a plurality of item name portions belonging to a file portion; and item encryption program product code (C3) for encrypting all of item data elements in item data portion or portions belonging to the non-encrypted item data group in specified association with the item name portion or portions selected in the encryption item selecting program product code (C2).

In order to solve the above problems, the present invention is provided with the computer program product for encryption in which the data storage program product code (C1) has a program product code for storing two or more file portions, further comprising file selecting program product code (C4) for selecting file portion or portions from among the two or more file portions whereby the encryption item selecting program product code (C2) has a program product code for selecting an item name portion or portions from among the file portion or portions selected in the file selecting program product code (C4).

In order to solve the above problems, the present invention is provided with the computer program product for encryption wherein the computer readable code further comprises: secret key generating program product code (C5) for generating a plurality of secret keys used when all of item data elements in item data portion or portions belonging to the non-encrypted item data group in specified association with the item name portion or portions selected in the encryption item selecting program product code (C2) are encrypted in the item encryption program product code (C3); and secret key selecting program product code (C6) for selecting one secret key from among a plurality of the secret keys in specified association with each of the item name portion or portions selected by the encryption item selecting means.

In order to solve the above problems, the present invention is provided with the computer program product for encryption wherein the computer readable code further comprises: data writing program product code (C7) for writing item data portion or portions each having encrypted item data elements belonging to the encrypted item data group or item data elements belonging to the non-encrypted item data group into the data storage program product code (C1) in accordance with item name portion or portions, whereby the item encryption program product code (C3) has a program product code for encrypting all of item data elements in item data portion or portions belonging to the non-encrypted item data group in specified association with item name portion or portions selected in the encryption item selecting program product code (C2), and the data writing program product code (C7) having a program product code for writing all of the encrypted item data elements belonging to the encrypted item data group in place of item data elements belonging to the non-encrypted item data group in the item data portion into the data storage program product code (C1).

In order to solve the above problems, the present invention is provided with the computer program product for encryption which further comprises the item compression program product code (C8) for compressing all of the encrypted item data elements in the item data portion or portions belonging to the encrypted item data group.

In order to solve the above problems, the present invention is provided with the computer program product for encryption wherein said computer readable code comprises: item search program product code (C9) for selecting a search key from among a plurality of item name portions, and searching an item name portion in a file portion on the basis of the search key, the search key being in unique relationship with the item name portion.

In order to solve the above problems, according to the present invention is provided with the computer program product for encryption in which the item search program product code (C9) has a program product code for selecting a search key from among a plurality of item name portions belonging to a file portion, and searching an item name portion in specified association with an item data portion belonging to the encrypted item data group with all of the item data elements encrypted, in the file portion on the basis of the search key.

In order to solve the above problems, the present invention is provided with the computer program product for encryption in which the data storage program product code (C1) has a program product code for storing the data block including two or more file portions, the item search program product code (C9) having a program product code for selecting a search key from among a plurality of item name portions belonging to a file portion having at least one item name portion in specified association with an item data portion belonging to the encrypted item data group with all of the item data elements in the item data portion encrypted, and searching an item name portion belonging to a file portion other than the file portion on the basis of the search key.

In order to solve the above problems, the present invention is provided with the computer program product for encryption in which the data storage program product code (C1) having a program product code for storing the data block including two or more file portions, the item search program product code (C9) having a program product code for selecting a search key from among a plurality of item name portions belonging to a file portion, and searching an item name portion belonging to another file portion other than the file portion, the another file portion having at least one item name portion in specified association with an item data portion belonging to the encrypted item data group with all of the item data elements in the item data portion encrypted, on the basis of the search key.

In order to solve the above problems, the present invention is provided with the computer program product for encryption in which the data storage program product code (C1)

having a program product code for storing the data block including two or more file portions, and the item search program product code (C9) having a program product code for selecting a search key from among a plurality of item name portions, and searching an item name portion in the file portions including at least one file portion having at least one item name portion in specified association with an item data portion belonging to the encrypted item data group with all of the item data elements in the item data portion encrypted, on the basis of the search key.

In order to solve the above problems, the present invention is provided with the computer program product for encryption in which the data storage program product code (C1) having a program product code for storing the data block including an encryption setting data portion having setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising the encryption information encryption program product code (C10) for encrypting all of the setting information data elements in the encryption setting data portion.

In order to solve the above problems, the present invention is provided with the computer program product for encryption in which the encryption information encryption program product code (C10) having a program product code for encrypting all of the setting information data elements in the encryption setting data portion, and storing the encryption setting data portion with encrypted setting information data elements in a computer usable storage medium.

In order to solve the above problems, the present invention is provided with the computer program product for encryption in which the encryption information encryption program product code (C10) having a program product code for encrypting all of the setting information data elements in the encryption setting data portion, and storing the encryption setting data portion with encrypted setting information elements in a memory unit.

In order to solve the above problems, the present invention is provided with the computer program product for encryption in which the data storage program product code (C1) having a program product code for storing the data block including an encrypted encryption setting data portion having setting information data elements, the setting information data elements being referred to when an item name portion is selected from among a plurality of item name portions belonging to a file portion, and when all of item data elements in an item data portion belonging to the non-encrypted item data group in specified association with the selected item name portion are encrypted, and further comprising the encryption information decryption program product code (C11) for decrypting all of the encrypted setting information data elements in the encryption setting data portion in a memory unit, whereby the encryption method has a program product code for selecting an item name portion from among a plurality of item name portions in a file and encrypting all of item data elements in an item data portion belonging to the non-encrypted item data group in specified association with the selected item name portion on the basis of the encryption setting data portion.

In order to solve the above problems, the present invention is provided with the computer program product for encryption in which the data storage program product code (C1) having a program product code for storing the item data portion including one or more image data elements.

In order to solve the above problems, the present invention is provided with the computer program product for encryption in which the data storage program product code (C1) having a program product code for storing the item data portion including one or more audio data elements.

In order to solve the above problems, the present invention is provided with the computer program product for encryption in which the data storage program product code (C1) having a program product code for storing the file portion including one or more tables in a database.

In order to solve the above problems, the present invention is provided with the decryption method, comprising: data storage program product code (D1) for storing a data block including at least one file portion having a plurality of item name portions and a plurality of item data portions each having a plurality of item data elements, the item name portions being in specified association with the item data portions, respectively, and the item data portions being divided into two groups consisting of an encrypted item data group with all of the item data elements in the item data portion encrypted and a non-encrypted item data group with all of the item data elements in the item data portion not encrypted; decryption item selecting program product code (D2) for selecting item name portion or portions from among a plurality of item name portions belonging to a file portion; and item decryption program product code (D3) for decrypting all of encrypted item data elements in item data portion or portions belonging to the encrypted item data group in specified association with the item name portion or portions selected in the decryption item selecting program product code (D2).

In order to solve the above problems, the present invention is provided with the computer program product for decryption in which the data storage program product code (D1) having a program product code for storing the data block including a plurality of secret keys used when all of encrypted item data elements in item data portion or portions belonging to the encrypted item data group in specified association with the item name portion or portions selected in the decryption item selecting program product code (D2) are decrypted in the item decryption program product code (D3), and further comprising the secret key selecting program product code (D4) for selecting a secret key from among a plurality of the secret keys in specified association with each of the item name portion or portions selected in the decryption item selecting program product code (D2).

In order to solve the above problems, the present invention is provided with the decryption apparatus which further comprises the data reading program product code (D5) for reading item data portion or portions each having encrypted item data elements belonging to the encrypted item data group or item data elements belonging to the non-encrypted item data group from the data storage program product code (D1) in accordance with item name portion or portions, whereby the item decryption program product code (D3) has a program product code for decrypting all of the encrypted item data elements in item data portion or portions belonging to the encrypted item data group in specified association with item name portion or portions selected in the decryption item selecting program product code (D2), and the data reading program product code (D5) has a program product code for reading all of the decrypted item data elements belonging to the non-encrypted item data group in place of encrypted item data elements belonging to the encrypted item data group in the item data portion from the data storage program product code (D1).

In order to solve the above problems, the present invention is provided with the computer program product for decryption further comprising the item decompression program product code (D6) for decompressing all of compressed encrypted data elements in item data portion or portions in specified association with item name portion or portions selected in the decryption item selecting program product code (D2), whereby the item decompression program product code (D6) has a program product code for decompressing all of the compressed encrypted data elements in the item data portion or portions in specified association with the item name portion or portions selected in the decryption item selecting program product code (D2), and the item decryption program product code (D3) has a program product code for decrypting all of the encrypted data elements decompressed in the item decompression program product code (D6).

In order to solve the above problems, the present invention is provided with the computer program product for decryption in which the data storage program product code (D1) has a program product code for storing the data block including an encrypted decryption setting data portion having encrypted setting information data elements, the setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising the decryption information decryption program product code (D7) for decrypting all of the encrypted setting information data elements in the encrypted decryption setting data portion in a memory unit, whereby the decryption method has the steps of selecting an item name portion from among a plurality of item name portions belonging to a file portion on the basis of the setting information data elements decrypted in the decryption information decryption program product code (D7), and decrypting all of encrypted item data elements in an item data portion belonging to the encrypted item data group in specified association with the selected item name portion.

In order to solve the above problems, the present invention is provided with the computer program product for decryption in which the decryption information decryption program product code (D7) has a program product code for decrypting the encrypted decryption setting data portion stored in the data storage program product code (D1) in a memory unit.

In order to solve the above problems, the present invention is provided with the computer program product for decryption in which the decryption information decryption program product code (D7) has a program product code for decrypting the encrypted decryption setting data portion stored in a memory unit.

In order to solve the above problems, the present invention is provided with the computer program product for decryption in which the data storage program product code (D1) has a program product code for storing the data block including a decryption setting data portion having setting information data elements being referred to when an item name portion is selected from among a plurality of item name portions belonging to a file portion, and when all of encrypted item data elements in an item data portion belonging to the encrypted item data group in specified association with the selected item name portion are decrypted, and further comprising the decryption information encryption program product code (D8) for encrypting an of the setting information data elements in the decryption setting data portion.

In order to solve the above problems, the present invention is provided with the computer program product for decryption in which the data storage program product code (D1) has a program product code for storing the item data portion including one or more image data portions.

In order to solve the above problems, the present invention is provided with the computer program product for decryption in which the data storage program product code (D1) has a program product code for storing the item data portion including one or more audio data portions.

In order to solve the above problems, the present invention is provided with the computer program product for decryption in which the data storage program product code (D1) has a program product code for storing the file portion including one or more tables in a database.

BRIEF DESCRIPTION OF THE DRAWINGS

The objects, features and advantages of the present invention will become apparent as the description proceeds when taken in conjunction with the accompanying drawings, in which:

FIG. 3 is a block diagram showing one embodiment of the encryption apparatus according to the present invention, FIG. 5 is a block diagram showing one embodiment of the encryption apparatus according to the present invention, FIG. 7 is a block diagram showing one embodiment of the decryption apparatus according to the present invention, FIG. 11 is a drawing diagram showing one embodiment of a database to be encrypted by the encryption apparatus according to the present invention, FIG. 12 is a drawing showing one embodiment of a database to be encrypted by the encryption apparatus according to the present invention.

DESCRIPTION OF THE PREFERRED EMBODIMENTS

The detailed description of the preferred embodiments according to the present invention applied to encryption and decryption apparatuses, methods and computer program products will now be made hereinafter with reference to the accompanying drawings.

Referring now to FIGS. 1 to 19 of the drawings, a first preferred embodiment of encryption and decryption apparatuses, and methods according to the present invention will be described hereinlater.

Figure 1:
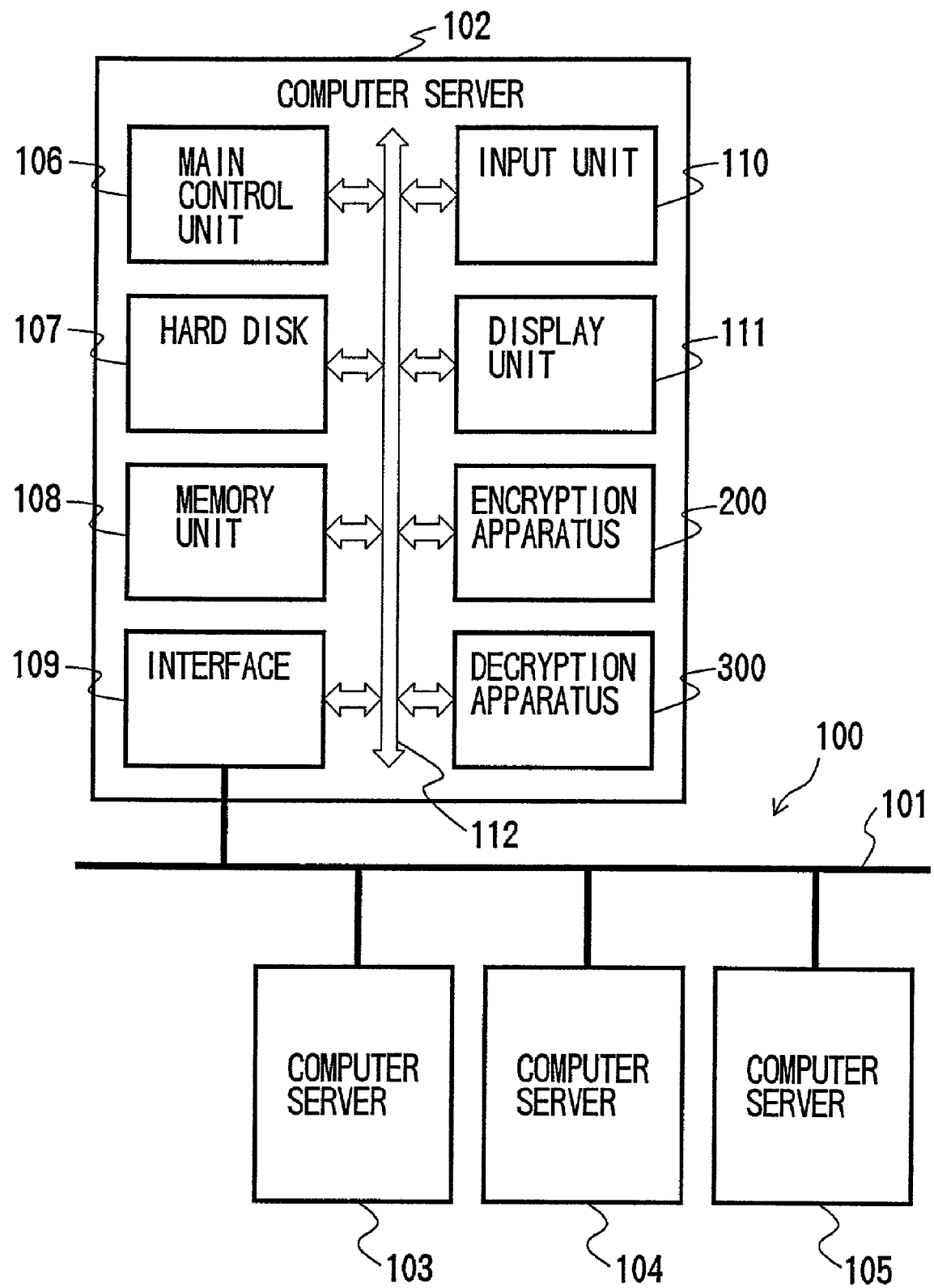
FIG. 1 is a block diagram showing a computer server which contains the encryption and decryption apparatuses according to the present invention.
Figure 17:
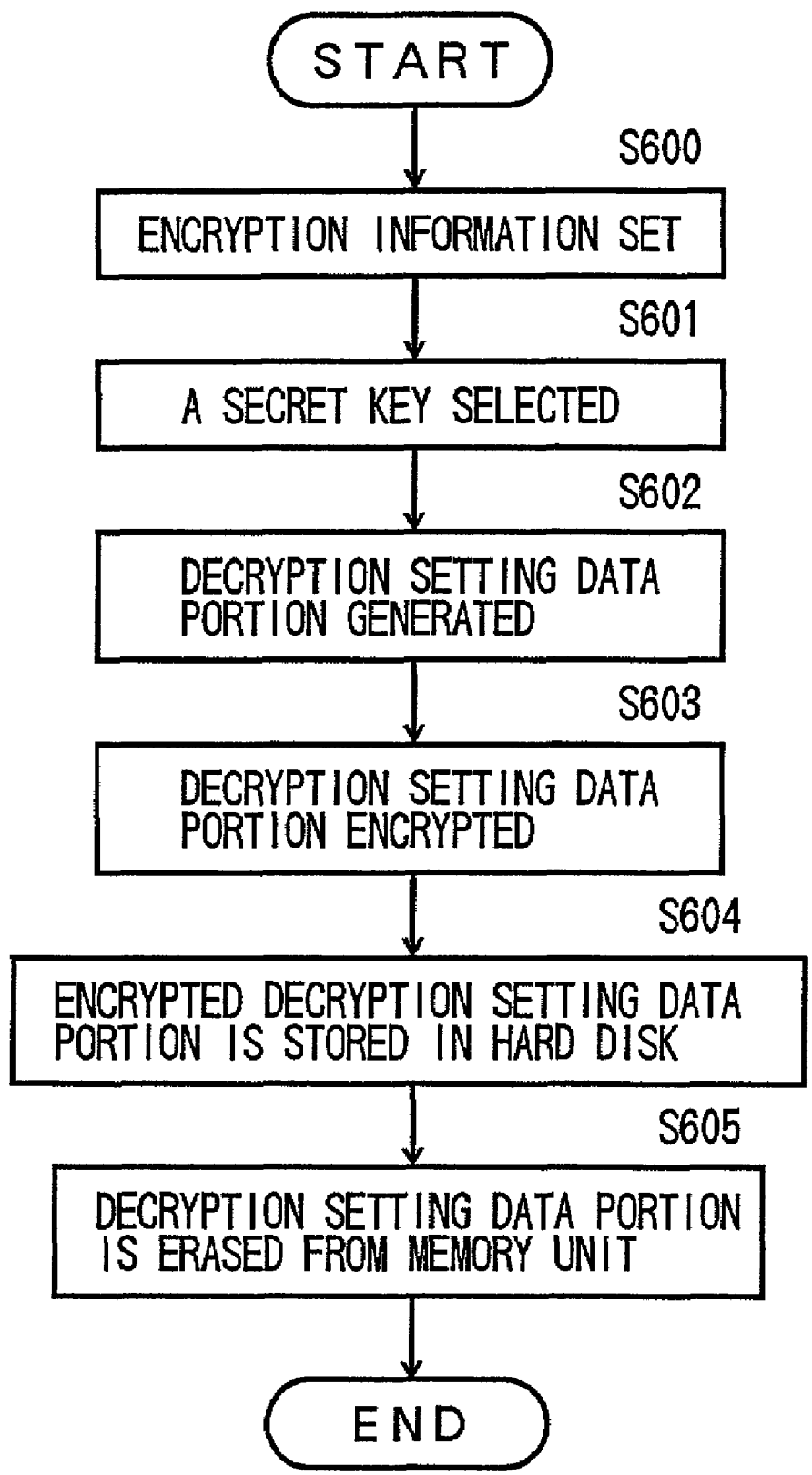
FIG. 17 is a flow chart to be used for explaining the decryption process performed by the decryption apparatus of the embodiment according to the present invention.
Figure 18:
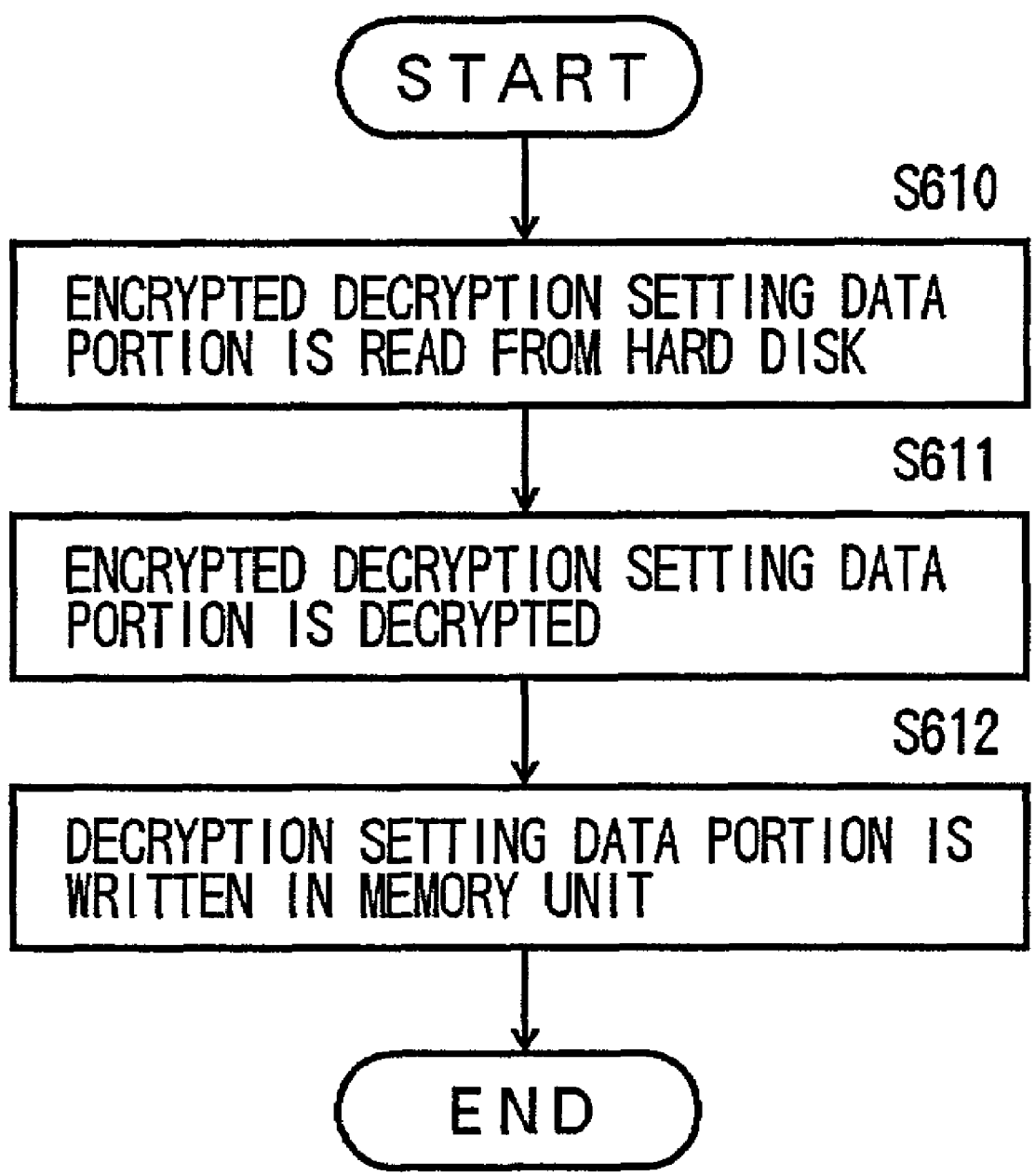
FIG. 18 is a flow chart to be used for explaining the decryption process performed by the decryption apparatus of the embodiment according to the present invention.
Figure 19:
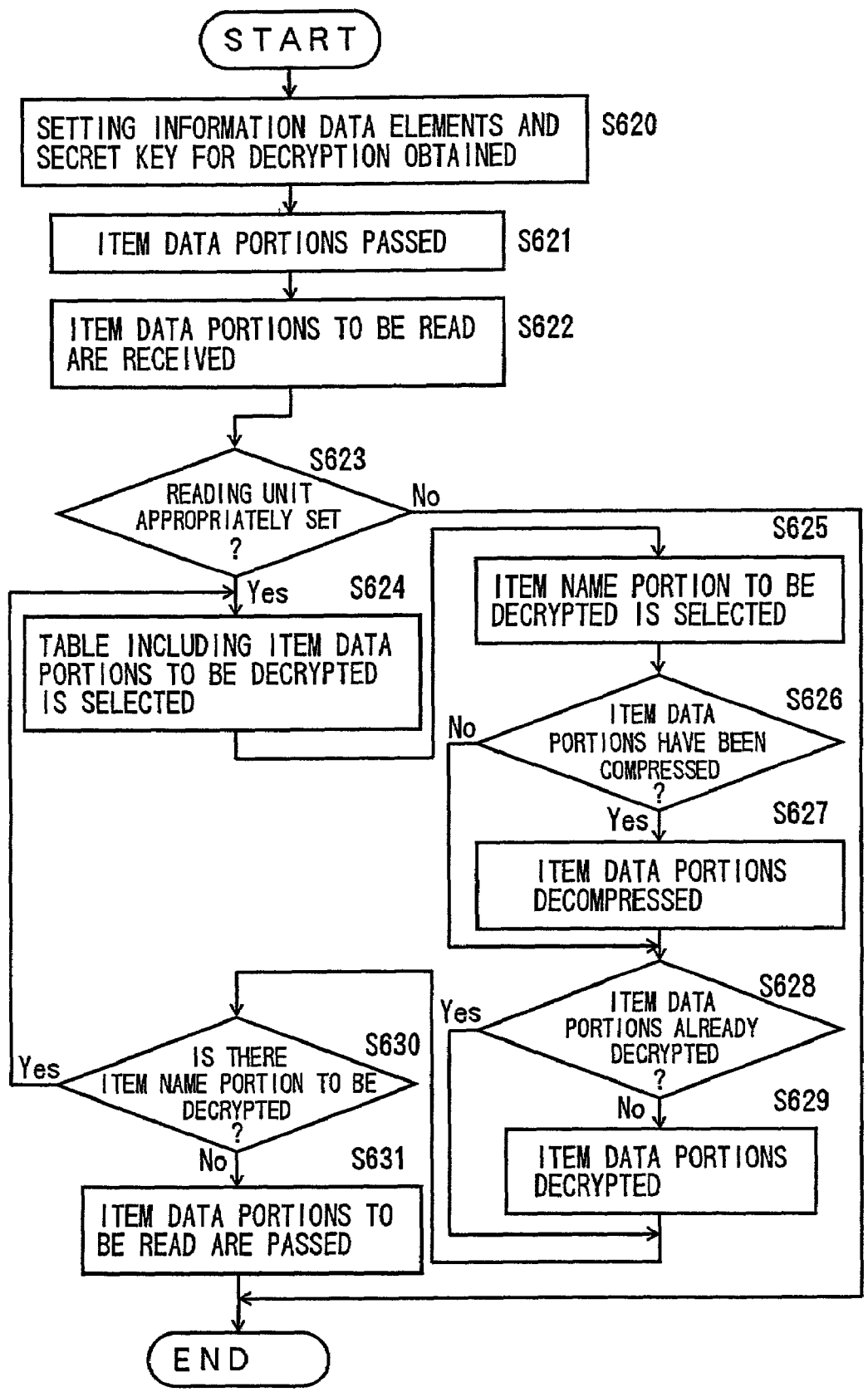
FIG. 19 is a flow chart to be used for explaining the decryption process performed by the decryption apparatus of the embodiment according to the present invention.

FIG. 1 is a block diagram showing a computer server which is designed to operate the encryption and decryption apparatuses of the embodiment according to the present invention. FIGS. 2 to 5 are block diagrams collectively showing the construction of the encryption apparatus of the embodiment according to the present invention. FIGS. 6 to 9 are block diagrams collectively showing the construction of the aforesaid decryption apparatus of the embodiment according to the present invention. FIGS. 10 to 12 are block diagrams collectively showing a database which is to be encrypted by the encryption apparatus of the embodiment according to the present invention. FIGS. 13 to 16 are flowcharts to be used for explaining the encrypting process of the processing unit forming part of the encryption apparatus of the embodiment according to the present invention. FIGS. 17 to 19 are flowcharts to be used for explaining the decrypting process of the processing unit forming part of the decryption apparatus of the embodiment according to the present invention.

FIG. 1 is a drawing which represents a whole construction of a network system constituted by a computer server which is designed to operate encryption and decryption apparatuses of the embodiment according to the present invention.

As shown in FIG. 1, the network system 100 comprises: network line 101 such as, for instance, public circuit and dedicated circuit; and computer servers 102 to 105 which are connected with one another via the network line 101 forming a connection such as internet, intranet, WAN (Wide Area Network), LAN (Local Area Network) and a combination thereof.

The computer server 102 includes main control unit 106 for controlling the computer server 102 as a whole in accordance with a predetermined control program, a hard disk unit 107 for storing the control program and data, a memory unit 108 for temporally storing the control program and data, an interface unit 109 for connecting the computer server with the network line 101, an input unit 110 for inputting data into the computer server 102, a display unit 111 for displaying data, and a system bus 112 for sending and receiving data among the aforesaid units.

The encryption apparatus 200 of the first preferred embodiment according to the present invention is best shown in FIG. 2 to 5.

Figure 2:
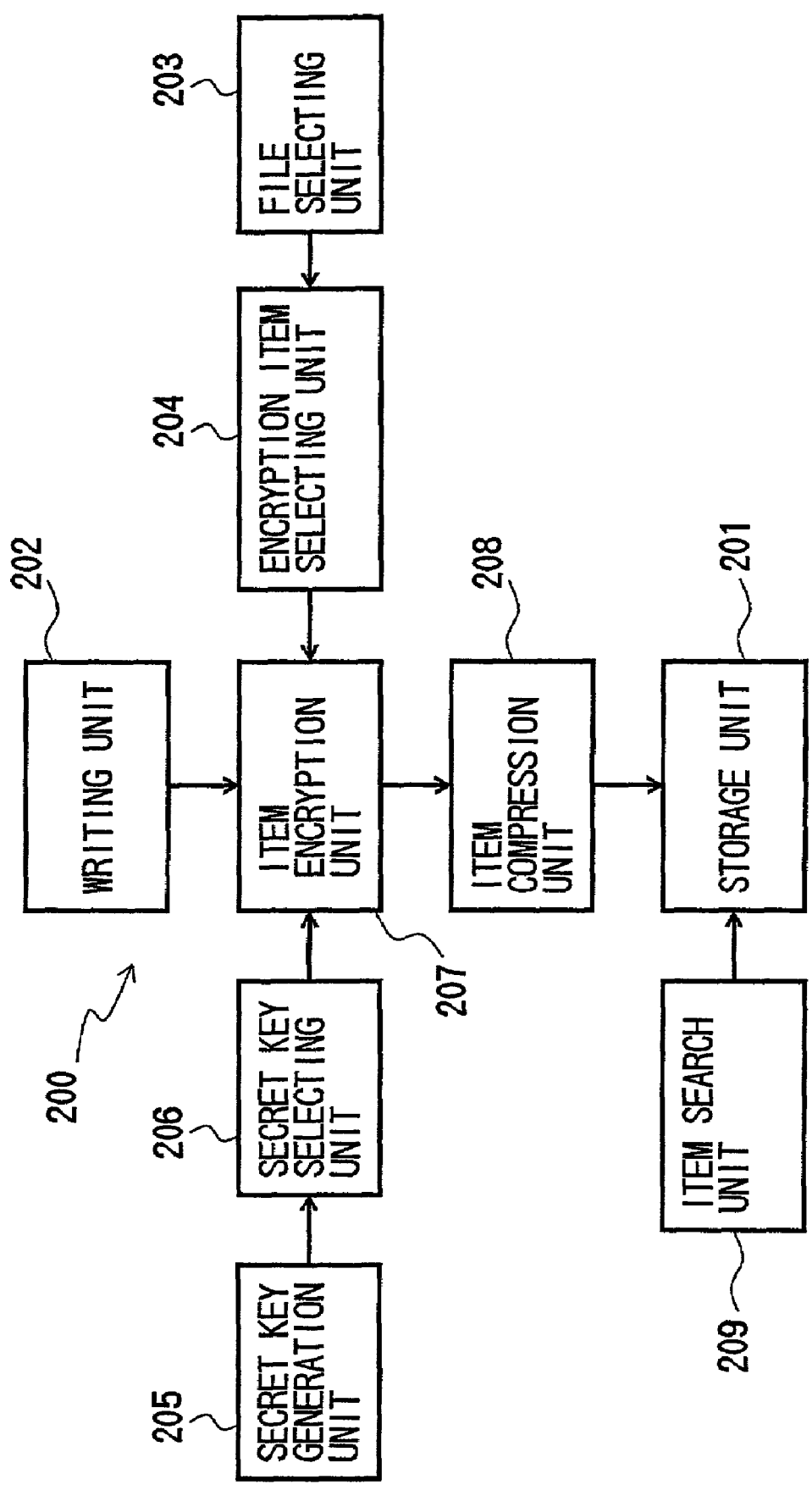
FIG. 2 is a block diagram showing one embodiment of the encryption apparatus according to the present invention.

As shown in FIG. 2, the encryption apparatus 200 includes a storage unit 201, a writing unit 202, a file selecting unit 203, an encryption item selecting unit 204, a secret key generating unit 205, a secret key selecting unit 206, an item encryption unit 207, an item compression unit 208, and an item search unit 209.

The storage unit 201 is designed to store a database having at least one table. The database is constituted by a data block. The table is constituted by a file portion. The table is composed of a plurality of item name portions and a plurality of item data portions. Each of the item name portions and the item data portions has a plurality of item data elements. The item name portions are in specified association with the item data portions, respectively. The item data portions are divided into two groups consisting of an encrypted item data group with all of item data elements in the item data portion encrypted and a non-encrypted item data group with all of item data elements in the item data portion not encrypted.

As shown in FIG. 3(a), the storage unit 201 is constructed by a hard disk 107. The storage unit 201 constitutes data storage means in the embodiment according to the present invention.

The writing unit 202 is designed to write item data elements made of a character and number data element, an image data element and a voice data element into item data portions belonging to a table stored in the storage unit 201 accordance with respective item name portions. Each of the item data portions has either encrypted item data elements belonging to the encrypted item data group or item data elements belonging to the non-encrypted item data group.

As shown in FIG. 3(b), the writing unit 202 is designed to perform a feature of a business program 210 which processes file portions of variety kinds. The writing unit 202 constitutes writing means in the embodiment according to the present invention.

The file selecting unit 203 is designed to select a table from among a plurality of tables having a plurality of item data portions written by the writing unit 202, which contains at least one item data portion having all of item data elements in the item data portion to be encrypted.

The file selecting unit 203 constitutes file selecting means in the embodiment according to the present invention.

The encryption item selecting unit 204 is designed to select an item name portion from among a plurality of item name portions in the table selected by the file selecting unit 203. All of item data elements in an item data portion in specified association with the thus selected item name portion are to be encrypted hereinlater.

The encryption item selecting unit 204 constitutes encryption item selecting means in the embodiment according to the present invention.

The secret key generating unit 205 is designed to generate a plurality of secret keys used when all of item data elements in an item data portion belonging to the non-encrypted item data group in specified association with the item name portion selected by the encryption item selecting unit 204 are encrypted. More specifically, the secret key generating unit 205 is adapted to generate a plurality of secret keys on the basis of random numbers. The secret key generating unit 205 constitutes secret key generating means.

The secret key selecting unit 206 is designed to select a secret key from among a plurality of the secret keys generated by the secret key generating unit 205 in specified association with each of the item name portions selected by the encryption item selecting unit 204. The item data elements encrypted with the thus selected secret key will be decrypted with the same secret key. The secret key selecting unit 206 constitutes secret key selecting means in the embodiment according to the present invention.

The item encryption unit 207 is designed to encrypt all of item data elements in an item data portion belonging to the non-encrypted item data group in specified association with the item name portion selected by the encryption item selecting unit 204, with the secret key selected by the secret key selecting unit 206.

The item encryption unit 207 constitutes item encryption means in the embodiment according to the present invention.

The item compression unit 208 is designed to select an item data portion having encrypted item data elements to be compressed, from among a plurality of item data portions each having encrypted item data elements belonging to the encrypted item data group, in specified association with the item name portions selected by the encryption item selecting unit 204, and compress all of the encrypted item data elements in the thus selected item data portion.

The item compression unit 208 constitutes item compression means in the embodiment according to the present invention.

The item search unit 209 is designed to select a search key from among a plurality of item name portions stored in the storage unit 201, and search an item name portion in a file portion on the basis of the thus selected search key. The search key is in unique relationship with the item name portion. The item search unit 209 constitutes item search means in the embodiment according to the present invention.

Figure 4:
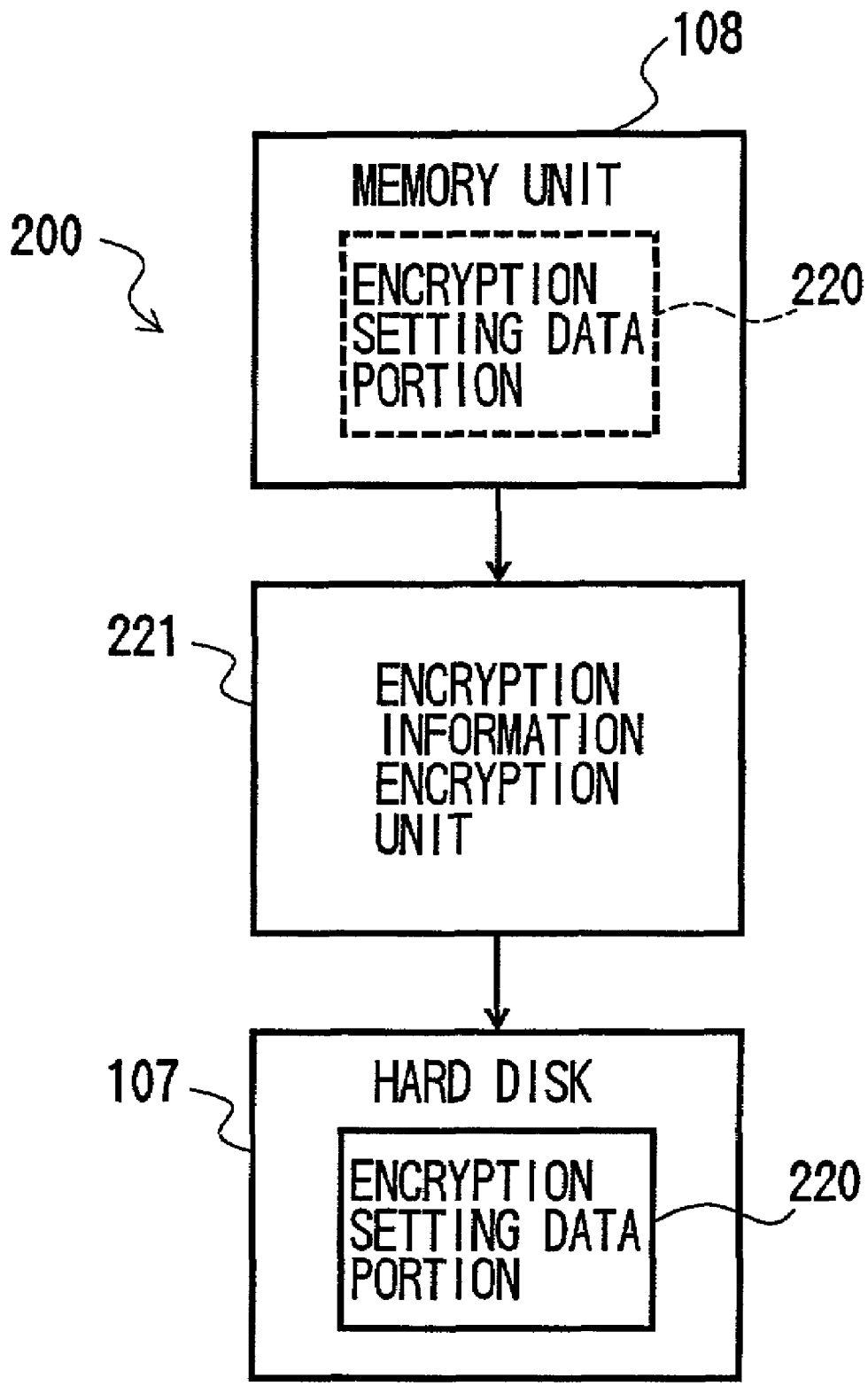
FIG. 4 is a block diagram showing one embodiment of the encryption apparatus according to the present invention.

As shown in FIGS. 4 and 5, the encryption apparatus 200 comprises an encryption information encryption unit 221, and an encryption information decryption unit 222. The encryption apparatus 200 is designed to generate encryption setting data portion 220.

The encryption setting data portion 220 has encryption setting information data elements and secret keys to be used for encryption. The encryption setting information data elements includes names of computer servers, databases, tables, and item name portions which encryption is to be performed to, and names of business programs which item data portions are to be written in. The encryption setting data portion 220 is generated in the memory unit 108 when the database is initialized or modified.

The encryption information encryption unit 221 is designed to encrypt all of the setting information data elements in the encryption setting data portion 220 generated in the memory unit 108, store the thus encrypted the encryption setting data portion 220 including the encrypted setting information data elements in the hard disk 107, and erase the encryption setting data portion 220 including the non-encrypted setting information data elements from the memory unit 108. The encryption information encryption unit 221 constitutes encryption information encryption means in the embodiment according to the present invention.

The encryption information decryption unit 222 is designed to decrypt all of the encrypted setting information data elements in the encryption setting data portion 220 stored in the hard disk 107, and store the thus decrypted non-encrypted encryption setting data portion 220 including the non-encrypted setting information data elements in the memory unit 108. The file selecting unit 203, the encryption item selecting unit 204, the secret key generating unit 205, the secret key 206, the item encryption unit 207, and item compression unit 208 are designed to execute encryption processing in accordance with the setting information data elements of the decrypted encryption setting data portion 220. The encryption information decryption unit 222 constitutes encryption information decryption means in the embodiment according to the present invention.

The decryption apparatus 300 of the embodiment according to the present invention is best shown in FIGS. 6 to 9.

Figure 6:
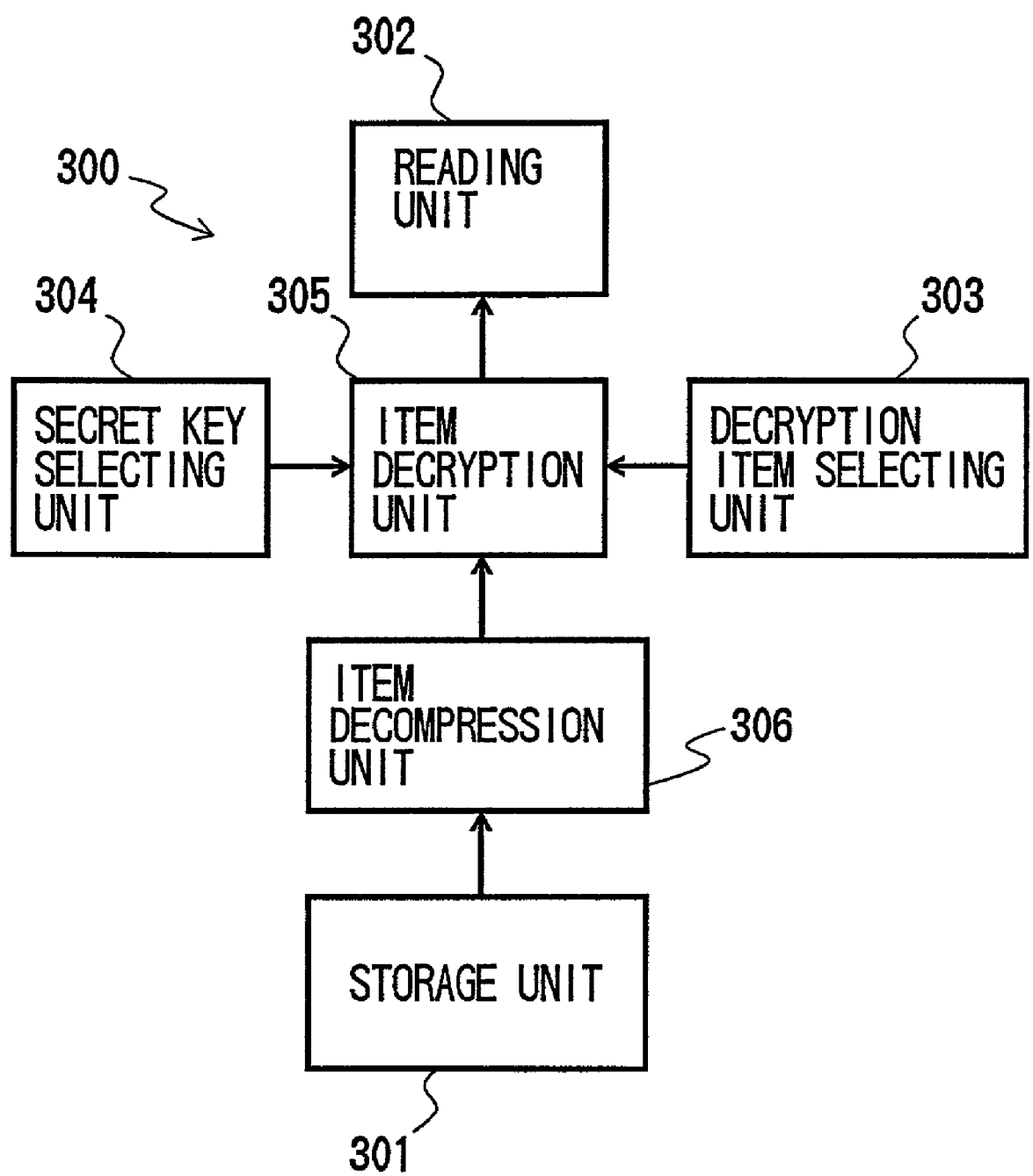
FIG. 6 is a block diagram showing one embodiment of the decryption apparatus according to the present invention.

As shown in FIG. 6, the decryption apparatus 300 includes a storage unit 301, a reading unit 302, a decryption item selecting unit 303, a secret key selecting unit 304, an item decryption unit 305, and an item decompression unit 306.

The storage unit 301 is designed to store a database having at least one table. The database is constituted by a data block. The table is constituted by a file portion. The table is composed of a plurality of item name portions and a plurality of item data portions. Each of the item name portions and the item data portions has a plurality of item data elements. The item name portions are in specified association with the item data portions, respectively. The item data portions are divided into two groups consisting of an encrypted item data group with all of item data elements in the item data portion encrypted and a non-encrypted item data group with all of item data elements in the item data portion not encrypted.

As shown in FIG. 7(a), the storage unit 301 is constructed by a hard disk 107. The storage unit 301 is operated to store the same data block as stored in the storage unit 201 of the encryption apparatus 200. The storage unit 301 constitutes data storage means in the embodiment according to the present invention.

The reading unit 302 is designed to read item data elements made of a character and number data element, an image data element and a voice data element from item data portions belonging to a table stored in the storage unit 301 in accordance with respective item name portions. Each of the item data portions has either encrypted item data element belonging to the encrypted item data group or item data elements belonging to the non-encrypted item data group.

As shown in FIG. 7(b), the reading unit 302 is designed to perform a feature of a business program 310 which processes file portions of variety kinds. The reading unit 302 constitutes the reading means in the embodiment according to the present invention.

The decryption item selecting unit 303 is designed to select an item name portion from among a plurality of item name portions in the table. All of the item data elements in an item data portion in specified association with the thus selected item name portion are to be encrypted hereinlater.

The decryption item selecting unit 303 constitutes decryption item selecting means in the embodiment according to the present invention.

The secret key selecting unit 304 is designed to select a secret key from among a plurality of the secret keys generated by the secret key generating unit 205 of the encryption apparatus 200 in specified association with each of the item name portions selected by the decryption item selecting unit 303. The encrypted item data elements will be decrypted with the same secret key used for the encryption. This means that the secret key selecting unit 304 is designed to select the same secret key with which all of the item data elements in the item data portion in specified association with the selected item name have been encrypted.

The secret key selecting unit 304 constitutes secret key selecting means in the embodiment according to the present invention.

The item decryption unit 305 is designed to decrypt all of item data elements in an item data portion selected by the decryption item selecting unit 303 with the secret key selected by the secret key selecting unit 304. The item decryption unit 305 constitutes item decryption means in the embodiment according to the present invention.

The item decompression unit 306 is designed to select an item name portion in specified association with an item data portion having compressed item data elements to be decompressed, from among a plurality of item name portions in specified association with a plurality of respective item data portions each having item data elements read by the reading unit 302, and decompress the item data elements in the item data portion in specified association with the thus selected item name portion. The item decompression unit 306 constitutes item decompression means in the embodiment according to the present invention.

Figure 8:
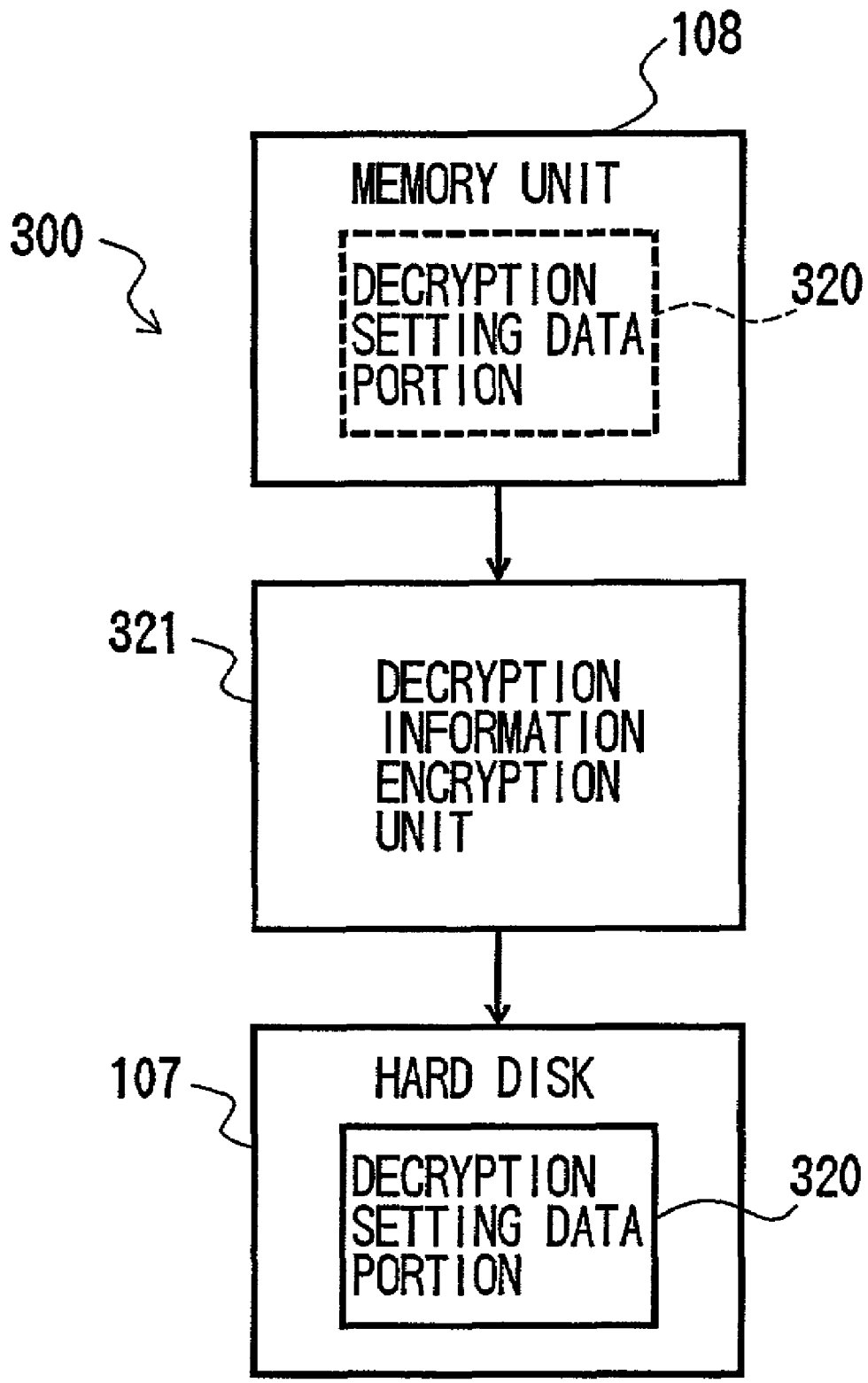
FIG. 8 is a block diagram showing one embodiment of the decryption apparatus according to the present invention.
Figure 9:
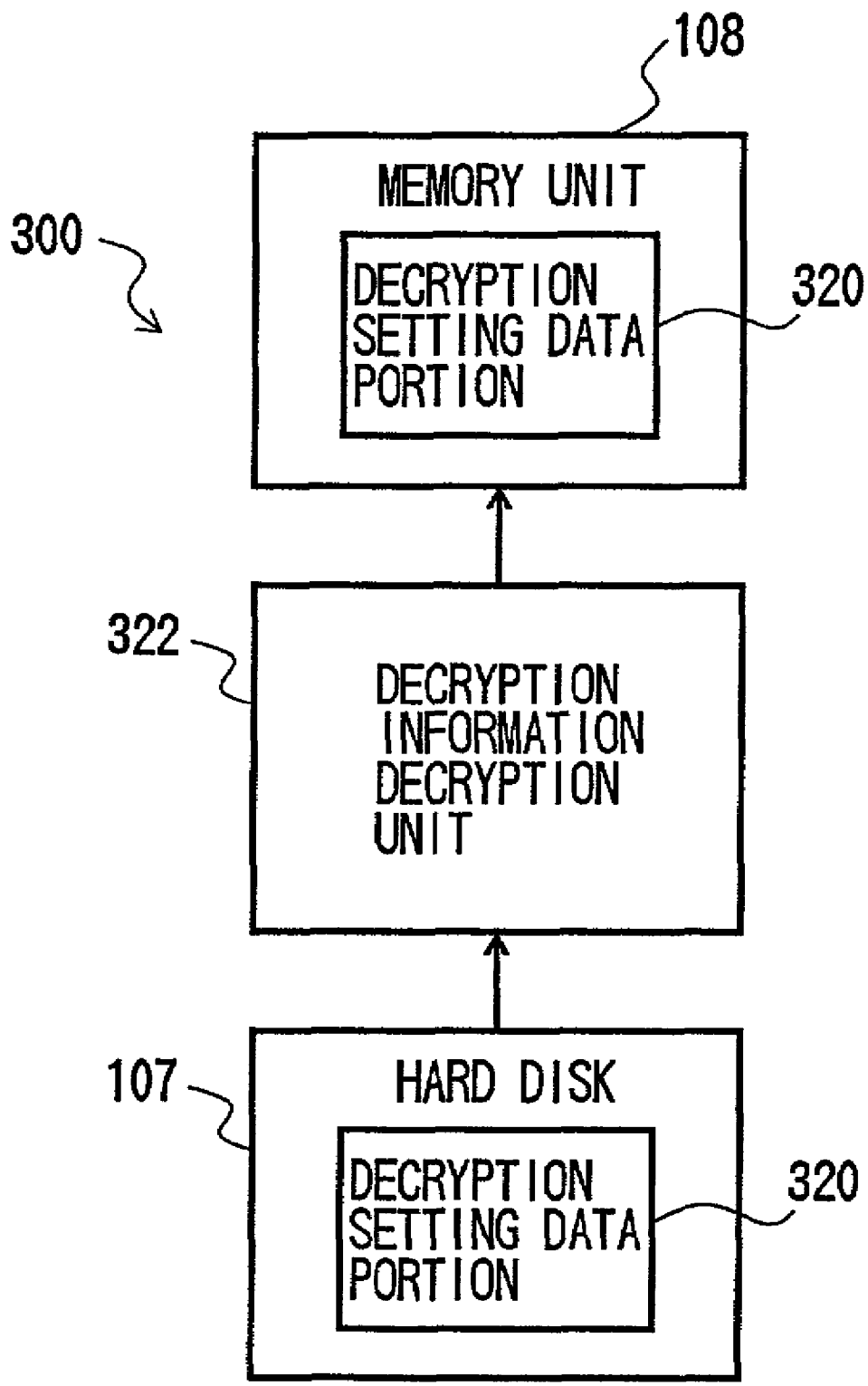
FIG. 9 is a block diagram showing one embodiment of the decryption apparatus according to the present invention.
Figure 10:
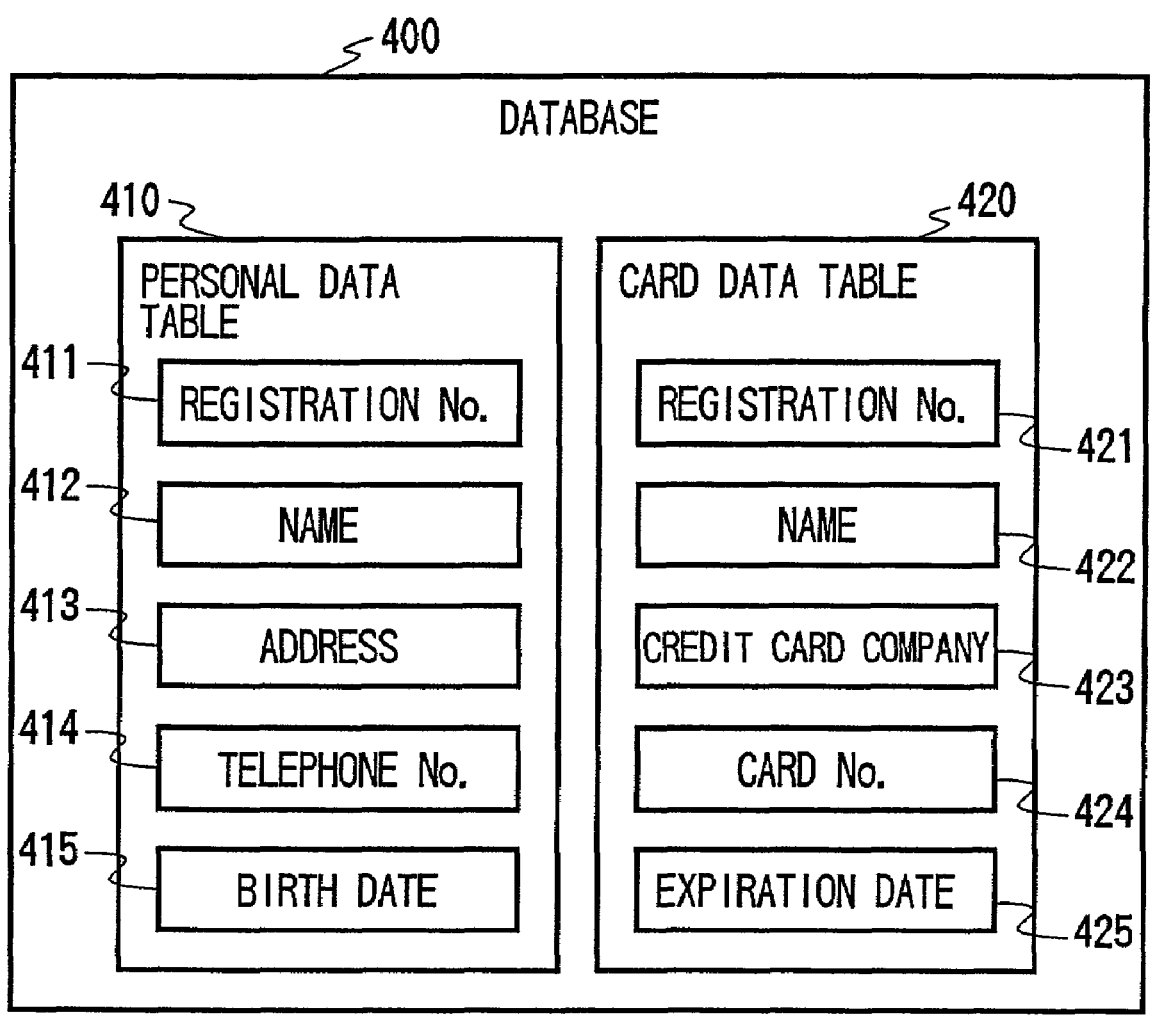
FIG. 10 is a drawing showing one embodiment of a database to be encrypted by the encryption apparatus according to the present invention.

As shown in FIGS. 8 and 9, the decryption apparatus 300 comprises a decryption information encryption unit 321, and a decryption information decryption unit 322. The decryption apparatus 300 is designed to generate decryption setting data portion 320.

The decryption setting data portion 320 has decryption setting information data elements and secret keys used for decryption. The decryption setting information data elements includes names of computer servers, databases, tables, and item name portions which decryption is to be performed to, and names of business programs which data is to be read from. The decryption setting data portion 320 is generated in the memory unit 108 upon initializing or modifying the database.

The decryption information encryption unit 321 is designed to encrypt all of the setting information data elements in the the decryption setting data portion 320 generated in the memory unit 108, store the thus encrypted decryption setting data portion 320 including the encrypted setting information data elements in the hard disk 107, and erase the decryption setting data portion 320 including the non-encrypted setting information data elements from the memory unit 108. The decryption information encryption unit 321 constitutes decryption information encryption means in the embodiment according to the present invention.

The decryption information decryption unit 322 is designed to decrypt all of the encrypted setting information data elements in the encrypted decryption setting data portion 320 stored in the hard disk 107, and store the thus decrypted non-encrypted decryption setting data portion 320 including the non-encrypted setting information data elements in the memory unit 108. The decryption item selecting unit 303, the secret key selecting unit 304, the item decryption unit 305, and item decompression unit 306 are designed to execute decryption processing in accordance with the setting information data elements of the decrypted decryption setting data portion 320. The decryption information decryption unit 322 constitutes decryption information encryption means in the embodiment according to the present invention.

Referring to FIGS. 10 to 12 of the drawings, there are shown the structure of a database 400 that will be encrypted by the encryption apparatus 200 of the embodiment according to the present invention.

As shown in FIG. 10, the storage unit 201 is operated to store the database 400 which is to be encrypt by the encryption apparatus 200 comprises a personal data table 410 and a card data table 420.

The personal data table 410 has five item name portions: a registration number item 411, a name item 412, an address item 413, a telephone number item 414, and a birth date item 415. Each of the item name portions includes item data elements such as "REGISTRATION No.", "NAME", "ADDRESS", "TELEPHONE", and BIRTH DATE". The card data table 420 has five item name portions: a registration number item 421, a name item 422, a credit card company name item 423, a card number item 424, and an expiration date item 425. Each of the item name portions includes item data elements such as "REGISTRATION No.", "NAME", "CREDIT CARD COMPANY", "CARD No.", and "EXPIRATION DATE".

As shown in FIG. 11, the personal data table 410 and the card data table 420 have item data portions in specified association with the item name portions. For instance, item name portion "NAME" in the personal data table 410 is in specified association with item data portions such as "Allen", "Winograd", "Schafer", and "Heidegger". Each of the item data portions includes item data elements made of a character and number data elements such as "1", "Allen", "Portland, N.Y.", "03-3123-4567" and "1960/04/01". Item data portions in specified association with an item name portion of the name item 412 in the personal data table 410 are reciprocally associated with one or more item data portions in specified association with the same item name portion of the name item 422 in the card data table 420 if there is provided the same item name portion in the card data table 420. If the item search unit 209 is operated to search specific item data portions, for instance, using an item data portion of "Harper" in the name item 412 of the personal data table 410 as a search key, an item data portion of "028-789-3456" is obtained from the telephone number item 414 of the personal data table 410, as well as item data portions of "ABC" and "KLM" are obtained from the credit card company item 423 of the card data table 420. On the contrary to this, if the item search unit 209 is operated to search specific item data portions, for instance, using item data portions of "DEF" and "367" of the credit card company item 423 and the card number item 424 of the card table data 420 as search keys respectively, an item data portion of "Bennett" is obtained from the name item 422 of the personal data table 420, and an item data portion of "026-567-8901" is obtained from the telephone number item 414 of the personal data table 410.

As shown in FIG. 12, the encryption apparatus 200 is operated to encrypt all of item data elements in the item data portions of the telephone number item 414 and the card number item 424 so as to make the item data elements of the item data potions of the telephone number item 414 and the card number item 424 unreadable. Although the item data portions of the telephone number item 414 and the card number item 424 are encrypted, the database 400 maintains the reciprocal relationships among the item data portions so that the item search unit 209 can search any item data portions of the personal data table 410 and the card data table 420. Furthermore, the decryption apparatus 300 is operated to decrypt the encrypted item data elements in the item data portions of the telephone number item 414 and the card number item 424 encrypted by the encryption apparatus 200 so as to generate non-encrypted item data elements in the item data portions of the telephone number item 414 and the card number item 424 as shown in FIG. 11.

Referring to FIGS. 13 to 16 of the drawings, there are shown flowcharts of the encryption process performed by the encryption apparatus 200 of the embodiment according to the present invention.

Figure 13:
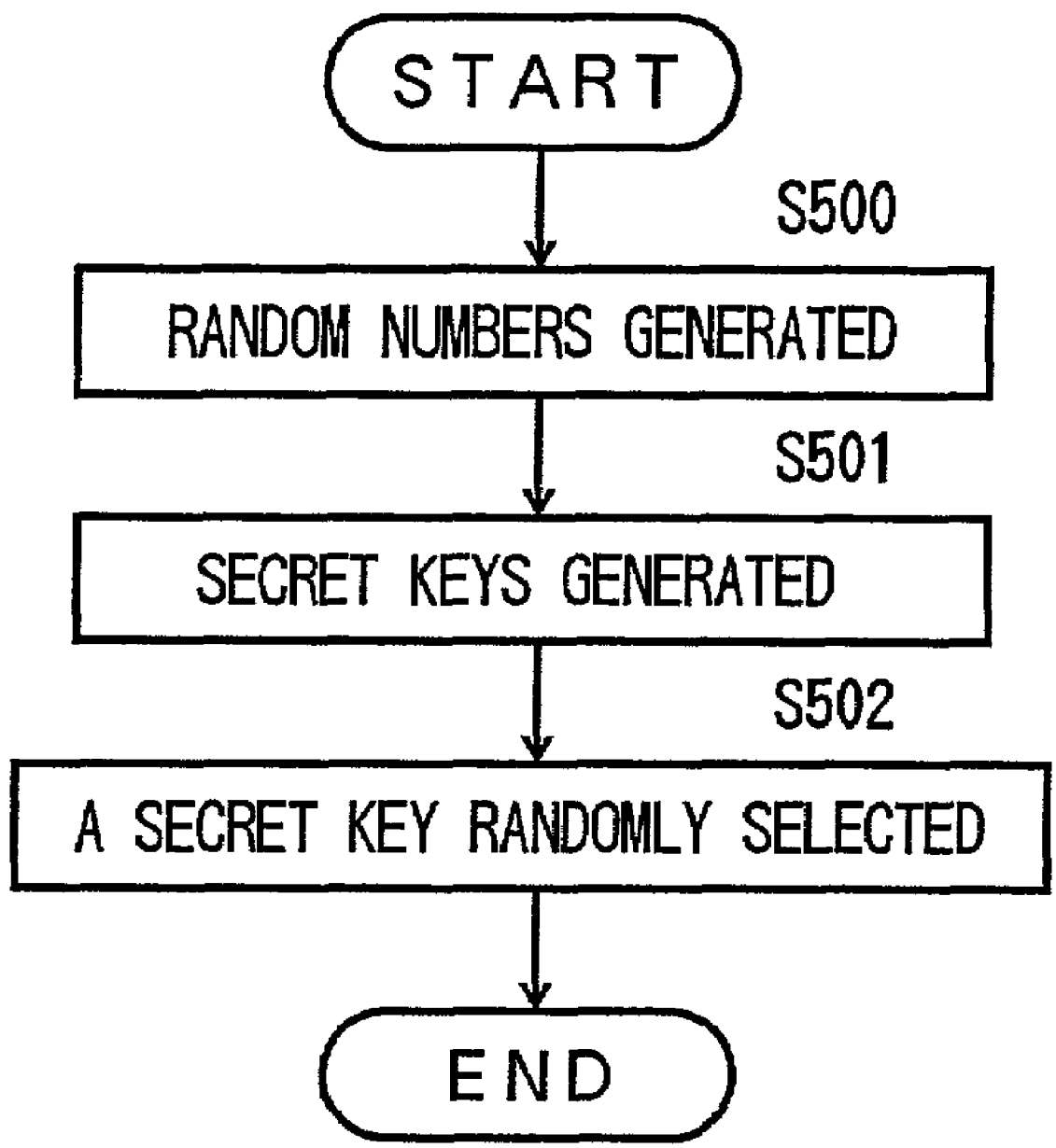
FIG. 13 is a flow chart to be used for explaining the encryption process performed by the encryption apparatus of the embodiment according to the present invention.

As shown in FIG. 13, there is shown the process of generating secret keys performed by the encryption apparatus 200 of the embodiment according to the present invention.

In the step S500, the secret key generating unit 205 is operated to generate random numbers (S500). The step S500 goes forward to the step S501 in which the secret key generating unit 205 is operated to generate a plurality of, for instance, 100,000 secret keys on the basis of the -generated random numbers (S501). The step S501 goes forward to the step S502 in which the secret key generating unit 205 is operated to select a plurality of secret keys, for instance, 100 secret keys to be used for encrypting all of item data elements in item data portions and one secret key to be used for encrypting setting information data elements in the encryption setting data portion 220, from among the generated 100,000 secret keys (S502). The step S501 goes to the step END in which the process of generating the secret keys ends (END).

Figure 14:
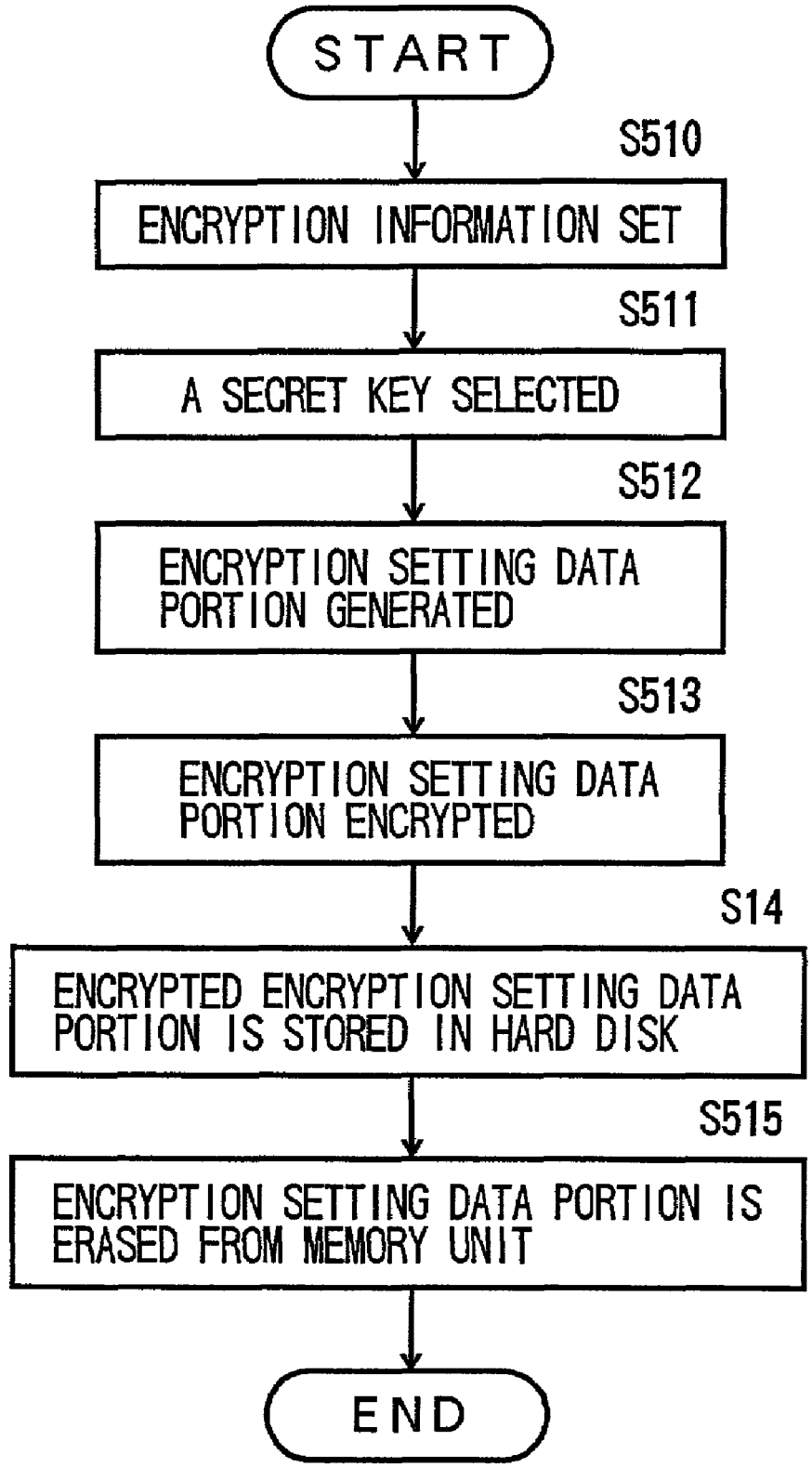
FIG. 14 is a flow chart to be used for explaining the encryption process performed by the encryption apparatus of the embodiment according to the present invention.

As shown in FIG. 14, there is shown the processes of generating and encrypting the encryption setting data portion 220 performed by the encryption apparatus 200 of the embodiment according to the present invention.

In the step S510, encryption information is set (S510). The encryption information includes names of computer servers, databases, tables, and item name portions which encryption is to be performed to, and names of business programs which item data portions are to be written in. The step S510 goes forward to the step S511 in which the secret key selecting unit 206 is operated to select one secret key to be used for encrypting all of item data elements in item data portions in specified association with each of item name portion to be encrypted, from among a plurality of secret keys generated by the secret key generating unit 205 (S511). The step S511 goes forward to the step S512 in which the encryption setting data portion 220 is generated in the memory unit 108 (S512). The encryption setting data portion 220 includes names of computer servers, databases, tables, and item name portions which encryption is to be performed to and names of business programs which item data portions are to be written in, and secret keys to be used for encryption The step S512 goes forward to the step S513 in which the encryption information encryption unit 221 is operated to encrypt all of item data elements in the encryption setting data portion 220 with the secret key generated by the secret key generating unit 205 (S513). The step S513 goes forward to the S514 in which the encryption information encryption unit 221 is operated to store the thus encrypted encryption setting data portion 220 including the encrypted item data elements in the hard disk 107 (S514). The step S514 goes forward to the step S515 in which the encryption information encryption unit 221 is operated to erase the encryption setting data portion 220 including all the non-encrypted data elements from the memory unit 108 (S515). Then, the step S515 goes forward to the step END in which the process of generating and encrypting the encryption setting data portion 220 ends (END).

Figure 15:
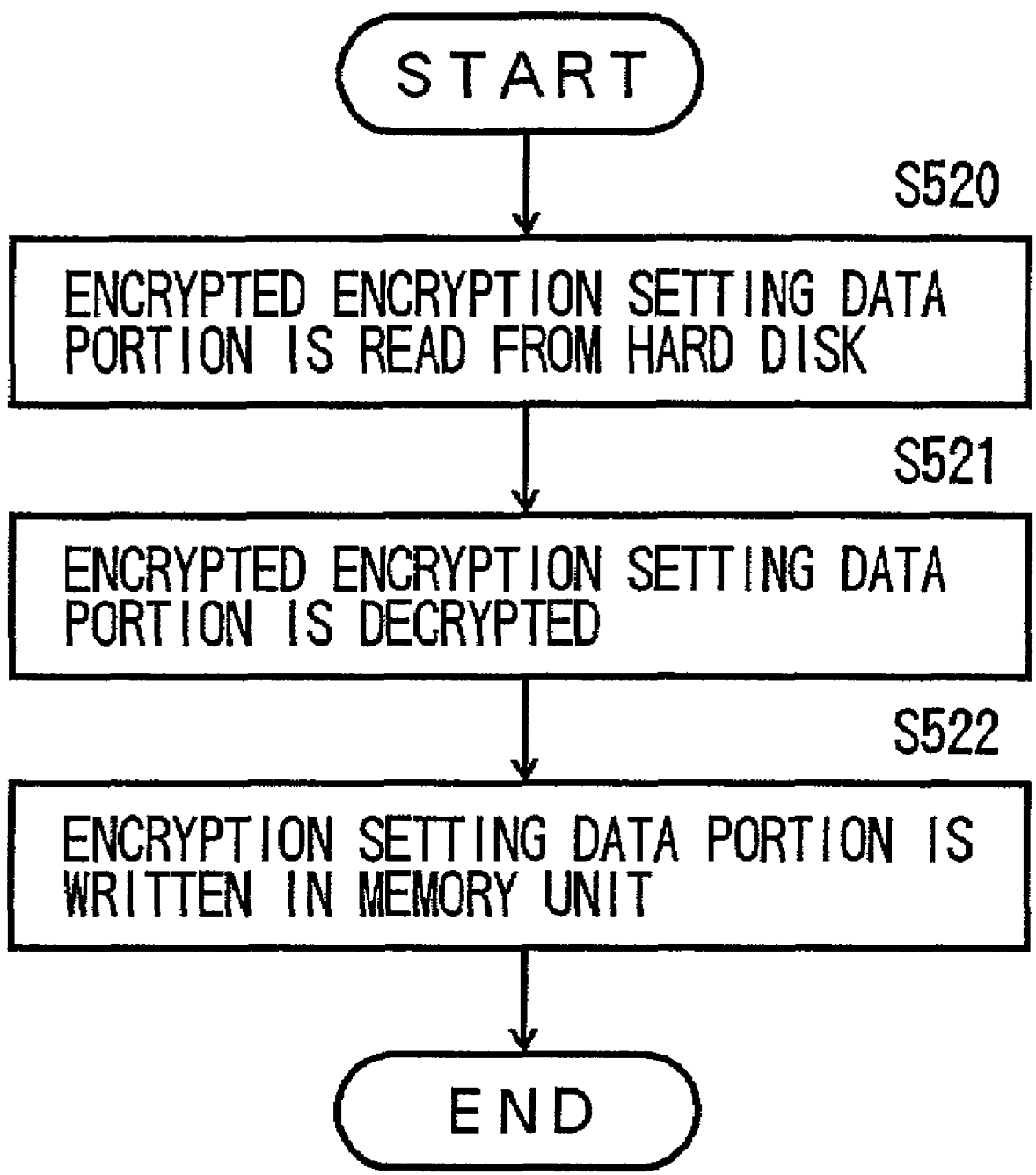
FIG. 15 is a flow chart to be used for explaining the encryption process performed by the encryption apparatus of the embodiment according to the present invention.

As shown in FIG. 15, there is shown the process of decrypting the encrypted encryption setting data portion 220 performed by the encryption apparatus 200 of the embodiment according to the present invention.

In the step S520, the encryption information decryption unit 222 is operated to read the encrypted encryption setting data portion 220 including the encrypted item data elements from the hard disk 107 (S520). The step S520 goes forward to the step S521 in which the encryption information decryption unit 222 is operated to decrypt all of the encrypted item data elements in the encrypted encryption setting data portion 220 with the same key used for the process of encrypting encryption setting data portion 220 (S521). The step S521 goes forward to the step S522 in which the encryption information decryption unit 222 is operated to write the thus obtained non-encrypted item data elements in the non-encrypted encryption setting data portion 220 in the memory unit 108 (S522). The step 522 goes forward to the step END in which the process of decrypting the encrypted encryption setting data portion 220 ends (END).

Figure 16:
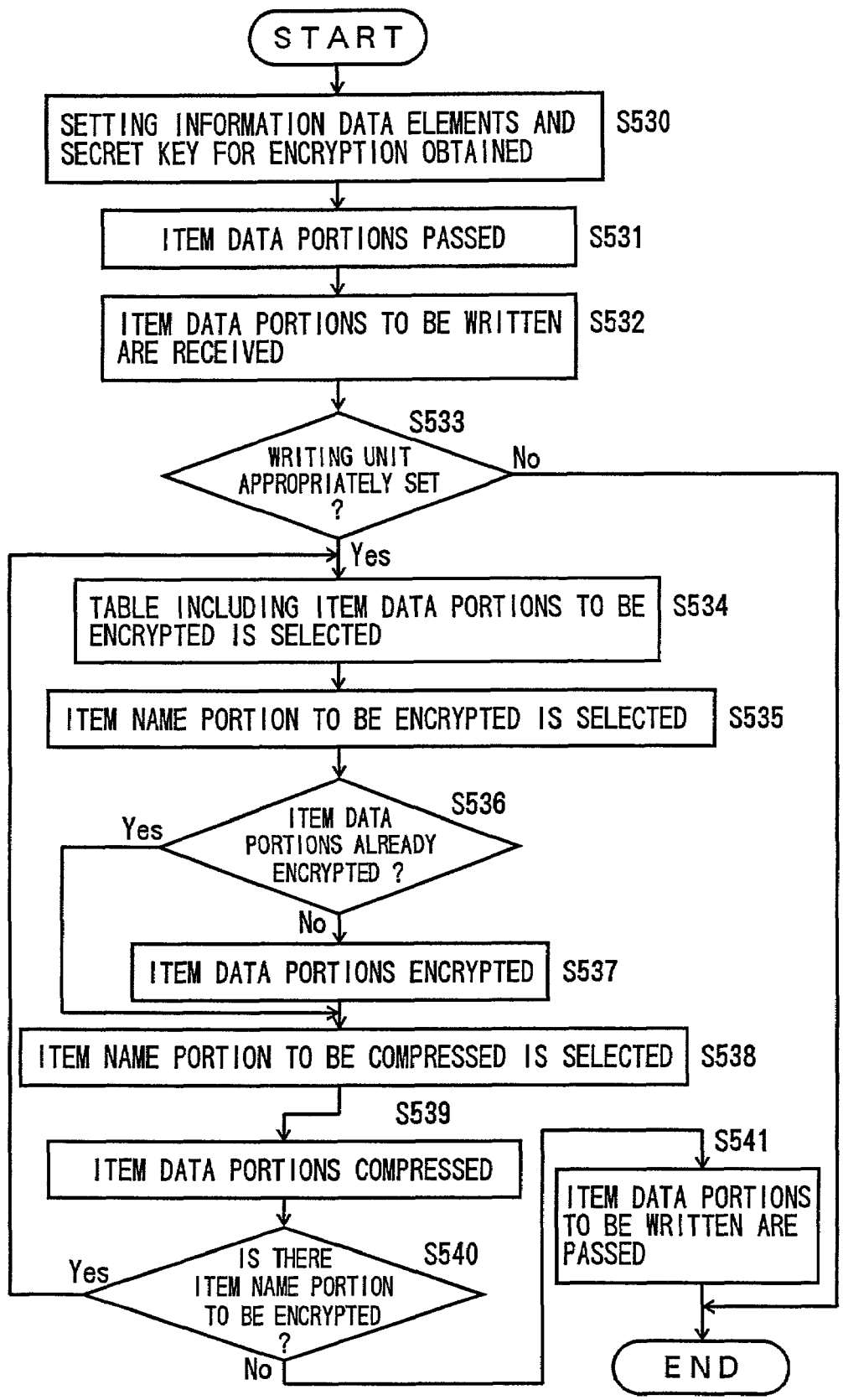
FIG. 16 is a flow chart to be used for explaining the encryption process performed by the encryption apparatus of the embodiment according to the present invention.

Referring now to FIG. 16, there is shown the encryption process performed by the encryption apparatus 200 of the embodiment according to the present invention will be described hereinlater.

In the step S530, the encryption apparatus 200 is operated to obtain the setting information data elements and the secret key to be used for the encryption process from the encryption setting data portion 220 decrypted in the memory unit 108 (S530). The step S530 goes forward to the step S531 in which the writing unit 202 is operated to pass a plurality of item data portions with all of item data elements to be written in the database 400 to the item encryption unit 207 (S531).

The step S531 goes forward to the step S532 in which the item encryption unit 207 is operated to receive item data portions with all of item data elements to be written in the database 400 (S532). The step S532 goes forward to the step S533 in which the item encryption unit 207 is operated to judge on whether or not the item data portions are to be written by the writing unit 202 of the business program 210 appropriately set on the basis of the encryption setting data portion 220 (S533). If the item encryption unit 207 judges that the item data portions are not to be written by the writing unit 202 of the thus set business program 210, the item encryption unit 207 judges that the item data portions are illegal item data portions made by an unauthorized business program and the step S533 goes forward to the step END in which the encryption process ends (END).

If the item encryption unit 207 judges that the item data portions are to be written by the writing unit 202 of the thus set business program 210, the step S533 goes forward to the step S534 in which the file selecting unit 203 is operated to select a table which has an item name portion in specified association with item data portions including item data elements to be encrypted, from among a plurality of tables each having a plurality of item name portions, on the basis of the setting information data elements of the encryption setting data portion 220 (S534). The step S534 goes forward to the step S535 in which the encryption item selecting unit 204 is operated to select an item name portion in specified association with item data portions having item data elements to be encrypted, from among a plurality of item name portions in the table selected by the file selecting unit 203 (S535).

The step S535 goes forward to the step S536 in which the item encryption unit 207 is operated to judge on whether or not the item data portions in specified association with the item name portion selected by the encryption item selecting unit 204 have already been encrypted (S536). This means that the item encryption unit 207 is operated to judge on whether or not the item data portions belong to the encrypted item data group with all of item data elements encrypted or not. If the item encryption unit 207 judges that the item data portions in specified association with the item name portion selected by the encryption item selecting unit 204 have not yet been encrypted, i.e., the item encryption unit 207 judges that the item data portions belong to the non-encrypted item data group with all of the item data elements not encrypted, the step S536 goes forward to the step S537 in which the item encryption unit 207 is operated to encrypt all of item data elements in the item data portions in specified association with the item name portion selected by the encryption item selecting unit 204 with a secret key selected by the secret key selecting unit 206 (S537). Then, the step S537 goes forward to the step S538. If the item encryption unit 207 judges that the item data portions in specified association with the item name portion selected by the encryption item selecting unit 204 have already been encrypted, i.e., the item encryption unit 207 judges that the item data portions belong to the encrypted item data group, the step S537 of encrypting all of item data elements in the item data portions is skipped. This means that the step S536 goes straight to the step S538 in which the item compression unit 208 is operated to select an item name portion in specified association with item data portions with item data elements to be compressed, from among the item name portions in specified association with item data portions with item data elements encrypted (S538). The step S538 goes forward to the step S539 in which the item compression unit 208 is operated to compress all of item data elements in the item data portions in specified association with the selected name data portions (S539).

The step S539 goes forward to the step 540 in which the item encryption unit 207 is operated to judge on whether or not there is another item name portion in specified association with item data portions with item data elements to be encrypted (S540). If the item encryption unit 207 judges that there is another item name portion in specified association with item data portions with item data elements to be encrypted, the item encryption unit 207 is operated to select the item name portion in specified association with the item data portions to be encrypted, and encrypt all of item data elements in the item data portions in specified association with the selected item name portion by repeating the encryption process from the step S534 to the step S539. If the item encryption unit 207 judges that there is no item name portion in specified association with item data portions having item data elements to be encrypted, the step S540 goes forward to the step S541 in which the item encryption unit 207 is operated to pass all of the item data portions having item data elements belonging to the encrypted item data group as well as item data elements belonging the non-encrypted item data group into the storage unit 201 (S541). The step S541 goes forward to the step END in which the encryption process ends (END).

Referring to FIGS. 17 to 19 of the drawings, there are shown flowcharts of the decryption process performed by the decryption apparatus 300 of the embodiment according to the present invention.

As shown in FIG. 17, there is shown the processes of generating and encrypting the decryption setting data portion 320 performed by the decryption apparatus 300 of the embodiment according to the present invention.

In the step S600, decryption information is set (S600). The decryption information includes names of computer servers, databases, tables, and item name portions which decryption is to be performed to and names of business programs which item data portions are to be read from. The step S600 goes forward to the step S601 in which the secret key selecting unit 304 is operated to select one secret key to be used for decrypting all of encrypted item data elements in item data portions in specified association with each of item name portion to be decrypted, from among a plurality of secret keys generated by the secret key generating unit 205 of the encryption apparatus 200 (S601). The step S601 goes forward to the step S602 in which the decryption setting data portion 320 is generated in the memory unit 108 (S602). The decryption setting data portion 320 includes names of computer servers, databases, tables, and item name portions which decryption is to be performed to and names of business programs which item data portions are to be read from, and secret keys used for decryption.

The step S602 goes forward to the step S603 in which the decryption information encryption unit 321 is operated to encrypt all of item data elements in the decryption setting data portion 220 with the same secret key which has been used for encrypting the encryption setting data portion 220 (S603). The step S603 goes forward to the S604 in which the decryption information encryption unit 321 is operated to store the thus encrypted decryption setting data portion 320 including the encrypted item data elements in the hard disk 107 (S604).

The step S604 goes forward to the step S605 in which the decryption information encryption unit 321 is operated to erase the decryption setting data portion 320 including all the non-encrypted data elements from the memory unit 108 (S605). Then, the step S605 goes forward to the step END in which the process of generating and encrypting the decryption setting data portion 320 ends (END).

As shown in FIG. 18, there is shown the process of decrypting the encrypted decryption setting data portion 320 performed by the decryption apparatus 300 of the embodiment according to the present invention.

In the step S610, the decryption information decryption unit 322 is operated to read the encrypted decryption setting data portion 320 including the encrypted item data elements from the hard disk 107 (S610). The step S610 goes forward to the step S611 in which the decryption information decryption unit 322 is operated to decrypt all of the encrypted item data elements in the encrypted decryption setting data portion 320 with the same key used for the process of encrypting the decryption setting data portion 320 (S611). The step S611 goes forward to the step S612 in which the decryption information decryption unit 322 is operated to write the thus obtained non-encrypted item data elements in the non-encrypted decryption setting data portion 320 in the memory unit 108 (S612). The step 612 goes forward to the step END in which the process of decrypting the decryption setting data portion 320 ends (END).

Referring now to FIG. 19, there is shown the decryption process performed by the decryption apparatus 300 of the embodiment according to the present invention.

In the step S620, the decryption apparatus 300 is operated to obtain the setting information data elements and the secret key to be used for the decryption process from the decryption setting data portion 320 decrypted in the memory unit 108 (S620). The step S620 goes forward to the step S621 in which the reading unit 302 is operated to pass a plurality of item data portions with all of item data elements to be read from the database 400 to the item decryption unit 305 (S621).

The step S621 goes forward to the step S622 in which the item decryption unit 305 is operated to receive item data portions with all of item data elements to be read from the database 400 (S622). The step S622 goes forward to the step S623 in which the item decryption unit 305 is operated to judge on whether or not the item data portions are to be read by the reading unit 302 of the business program 310 appropriately set on the basis of the decryption setting data portion 320 (S623). If the item decryption unit 305 judges that the item data portions are not to be read by the reading unit 302 of the thus set business program 310, the item decryption unit 305 judges that the item data portions are illegal item data portions made by an unauthorized business program and the step S623 goes forward to the step END in which the decryption process ends (END).

If the item decryption unit 305 judges that the item data portions are to be read by the reading unit 302 of the thus set business program 310, the step S623 goes forward to the step S624 in which the decryption item selecting unit 303 is operated to select a table which has an item name portion in specified association with item data portions including encrypted item data elements to be decrypted from among a plurality of tables each having a plurality of item name portions, on the basis of the setting information data elements of the decryption setting data portion 320 (S624). The step S624 goes forward to the step S625 in which the decryption item selecting unit 303 is operated to select an item name portion in specified association with item data portions having item data elements to be decrypted, from among a plurality of item name portions in the thus selected tables (S625).

The step S625 goes forward to the step S626 in which the item decompression unit 306 is operated to judge on whether or not item data elements in the item data portions in specified association with the item name portion selected by the decryption item selecting unit 303 have been compressed or not (S626). If the item decompression unit 306 judges that the item data elements in the item data portions in specified association with the item name portion selected by the decryption item selecting unit 303 have been compressed, the step S626 goes forward to the step S627 in which the item decompression unit 306 is operated to decompress the compressed item data elements in the item data portions in specified association with the item name portion selected by the decryption item selecting unit 303 (S627). If the item decompression unit 306 judges that the item data elements in the item data portions in specified association with the item name portion selected by the decompression item selecting unit 303 have not been compressed, the step S627 of decompressing the item data elements in the item data portions is skipped. This means that step 626 goes straight to the step S628.

In the step S628 in which the item decryption unit 305 is operated to judge on whether or not item data portions in specified association with the item name portion selected by the decryption item selecting unit 303 have already been decrypted or not (S628). This means that the item decryption unit 305 is operated to judge on whether or not the item data portions belong to the non-encrypted item data group with all of the item data elements not encrypted or not. If the item decryption unit 305 judges that the item data portions in specified association with the item name portion selected by the decryption item selecting unit 303 have not yet been decrypted, i.e., the item decryption unit 305 judges that the item data portions belong to the non-encrypted item data group with all of the item data elements encrypted, the step S628 goes forward to the step S629 in which the item decryption unit 305 is operated to decrypt all of item data elements in the item data portions in specified association with the item name portion selected by the decryption item selecting unit 303 with the secret key selected by a secret key selecting unit 304 (S629). The step S629 goes forward to the step S630. If the item decryption unit 305 judges that the item data elements in the item data portions in specified association with the item name portion selected by the decryption item selecting unit 303 have already been decrypted, i.e., the item decryption unit 305 judges that the item data portions belong to the non-encrypted item data group the step S629 of decrypting all of item data elements in the item data portions is skipped. This means that the step S628 goes straight to the step S630.

In the step S630, the item decryption unit 305 is operated to judge on whether or not there is another item name portion in specified association with item data portions with item data elements to be decrypted (S630). If the item decryption unit 305 judges that there is another item name portion in specified association with item data portions with item data elements to be decrypted, the item decryption unit 305 is operated to select the name portion in specified association with the item data portions with item data elements to be decrypted, and decrypt all of encrypted item data elements in the item data portions in specified association with the selected item name portions by repeating the decryption process from the step S624 to the step S629. If the item decryption unit 305 judges that there is no item name portion in specified association with item portions having item data elements to be decrypted, the step S630 goes forward to the step S631 in which the item decryption unit 305 is operated to pass all the item data portions having item data elements belonging to the encrypted item data group as well as item data elements belonging to the non-encrypted item data group to the reading unit 302 (S631). The step 631 goes forward to the step END in which the decryption process ends (END).

As described hereinbefore, the encryption and decryption apparatuses, methods and computer program products of the embodiment according to the present invention can encrypt and decrypt all of item data elements in item data portions in specified association with an item name portion of the database 400, thereby making it possible to select an important item name portion in the database 400 and encrypt only item data elements in item data portions in specified association with the thus selected item name portion. This leads to the fact that the confidentiality of the important item name portion can be protected against unauthorized use and tampering even if the database 400 is stolen.

Furthermore, the encryption and decryption apparatuses, methods and computer program products of the embodiment according to the present invention can encrypt and decrypt all of item data elements in item data portions in specified association with an item name portion of the database 400 while maintaining reciprocal relationships among the item data portions in the database 400 regardless of whether item data elements in the item data portions are encrypted or not. This leads to the fact that a data search function, which is a major feature of the database, remains enabled even if item data elements in item data portions of the database 400 have been encrypted.

The encryption and decryption apparatuses, methods and computer program products of the embodiment according to the present invention can encrypt and decrypt all of item data elements in item data portions in specified association with a specific item name portion of the database 400. This means that the encryption and decryption apparatuses, methods and computer program products of the embodiment according to the present invention can encrypt and decrypt only a part of the database 400, thereby making it possible to reduce a processing time required for encrypting and decrypting the database 400.

Moreover, the encryption and decryption apparatuses, methods and computer program products of the embodiment according to the present invention can encrypt all of item data elements in the encryption setting data portion 220 and all of item data elements in the decryption setting data portion 320, and store the thus encrypted encryption setting data portion 220 having the encrypted item data elements and decryption setting data portion 320 having the encrypted item data elements in the hard disk 107 as well as decrypt the encrypted item data elements in the encryption setting data portion 220 and the encrypted item data elements in the decryption setting data portion 320 in the hard disk 107, store and utilize the thus decrypted encryption setting data portion 220 having the non-encrypted item data elements and decryption setting data portion 320 having the non-encrypted item data elements in the memory unit 108. It is quite difficult to steal item data elements from the memory unit. This leads to the fact that the encryption and decryption setting information data elements are protected from leakage.

The encryption and decryption apparatuses, methods and computer program products of the embodiment according to the present invention can process the encryption setting data portion 220, the decryption setting data portion 320 and item data portions of the database 400 separately. This leads to the fact that item data elements in item data portions of the database can be encrypted and decrypted separately in specified association with a specific item name portion, thereby making it possible to enhance flexibility in database design.

The encryption and decryption apparatuses, methods and computer program products of the embodiment according to the present invention possesses two pieces of setting information such as the encryption setting data portion 220 and the decryption setting data portion 320. The encryption setting data portion 220 and the decryption setting data portion 320, however, may be integrated to one piece of setting information which includes the encryption setting data portion 220, the decryption setting data portion 320, and secret keys.

The encryption and decryption apparatuses, methods and computer program products of the embodiment according to the present invention is operated to encrypt all of item data elements in the encryption setting data portion 220 and decryption setting data portion 320, and store the thus encrypted encryption setting data portion 220 having the encrypted item data elements and decryption setting data portion 320 having the encrypted item data elements in the hard disk 107. The encrypted encryption setting data portion 220 having the encrypted item data elements and decryption setting data portion 320 having the encrypted item data elements, however, may be stored in the memory unit 108, or a computer program product comprising a computer usable storage medium having computer readable code embodied therein, such as a floppy disk, a compact disk (CD), a digital video disk (DVD), a magneto-optical disc (MO), and an electromagnetic tape.

The encryption and decryption apparatuses, methods and computer program products of the embodiment according to the present invention, the storage unit 201 of the encryption apparatus 200 and the storage unit 301 of the decryption apparatus 300 are included in the hard disk 107. The storage unit 201 of the encryption apparatus 200 and the storage unit 301 of the decryption apparatus 300, however, may be included in a computer program product comprising a computer usable storage medium having computer readable code embodied therein, such as a floppy disk, a compact disk (CD), a digital video disk (DVD), a magneto-optical disc (MO), an electromagnetic tape and a semiconductor memory.

Figure 20:
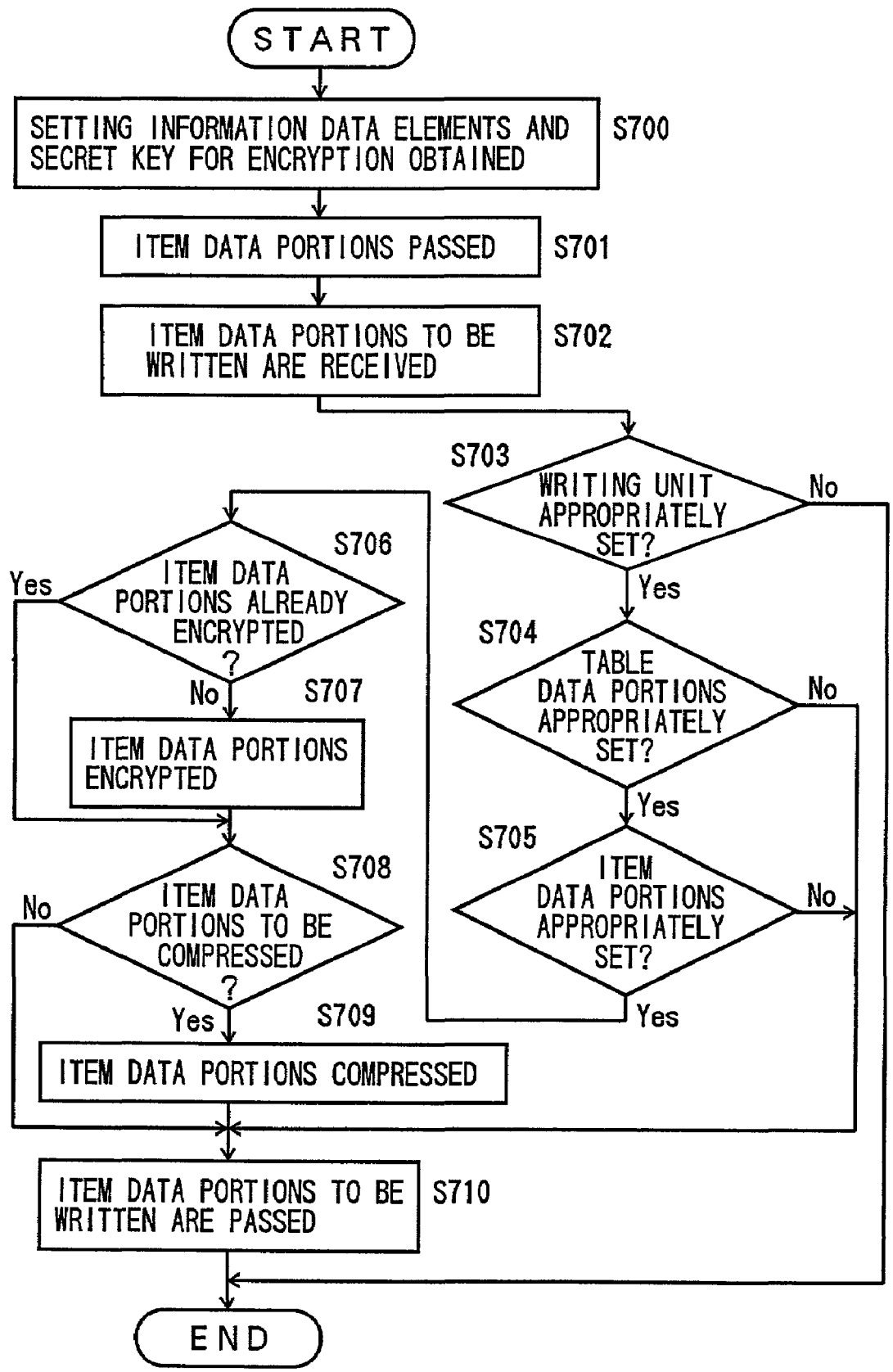
FIG. 20 is a flow chart to be used for explaining the encryption process performed by the encryption apparatus of the embodiment according to the present invention.
Figure 21:
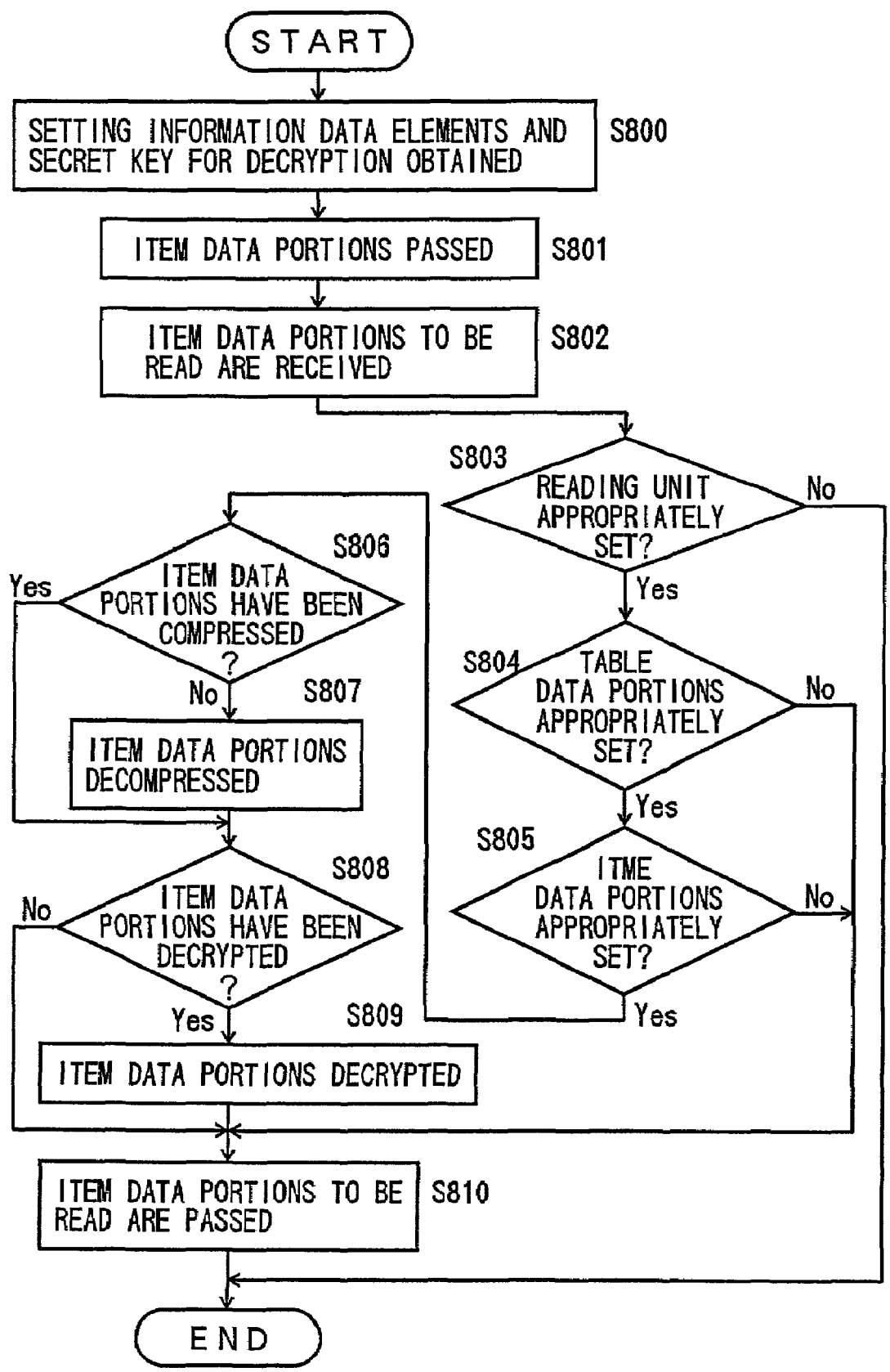
FIG. 21 is a flow chart to be used for explaining the decryption process performed by the decryption apparatus of the embodiment according to the present invention.

Referring to FIGS. 20 and 21 of the drawings, there are shown flowcharts of the encryption and decryption processes performed by the encryption apparatus 200 and the decryption apparatus 300 of the second preferred embodiment according to the present invention. The constructional elements and parts of each of the encryption apparatus and the decryption apparatus of the second embodiment according to the present invention are substantially identical to those of each of the encryption apparatus 200 and the decryption apparatus 300 of the first embodiment. These same constitutional elements and parts are simply represented by the same reference numerals as those of the first embodiment, and will thus be omitted in description for avoiding tedious repetition.

Referring to FIG. 20 of the drawing, there is shown a flowchart of the encryption process performed by the encryption apparatus 200 of the embodiment according to the present invention. Referring to FIG. 21 of the drawing, there is shown a flowchart of the decryption process performed by the decryption apparatus 300 of the embodiment according to the present invention.

Referring now to FIG. 20, the encryption process performed by the encryption apparatus 200 of the embodiment according to the present invention will be described hereinlater.

In the step S700, the encryption apparatus 200 is operated to obtain the setting information data elements and the secret key to be used for the encryption process, from the encryption setting data portion 220 decrypted in the memory unit 108 (S700). The step S700 goes forward to the step S701 in which the writing unit 202 is operated to pass item data portions with all of item data elements to be written in the database 400 to the item encryption unit 207, in specified association with one item name portion (S701).

The step S701 goes forward to the step S702 in which the item encryption unit 207 is operated to receive item data portions with all of item data elements to be written in the database 400 (S702). The step S702 goes forward to the step S703 in which the item encryption unit 207 is operated to judge on whether or not the item data portions are to be written by the writing unit 202 of the business program 210 appropriately set on the basis of the encryption setting data portion 220 (S703). If the item encryption unit 207 judges that the item data portions are not to be written by the writing unit 202 of the thus set business program 210, the item encryption unit 207 judges that the item data portions are illegal item data portions made by an unauthorized business program and the step S703 goes forward to the step END in which the encryption process ends (END).

If the item encryption unit 207 judges that the item data portions are to be written by the writing unit 202 of the thus set business program 210, the step S703 goes forward to the step S704 in which the file selecting unit 203 is operated to judge on whether or not the item data portions belong to table data portions appropriately set on the basis of the encryption setting data portion 220 (S704). If the file selecting unit 203 judges that the item data portions do not belong to the thus set table data portions, the step S704 goes straight to the step S710 in which the item encryption unit 207 is operated to pass the item data portions to be written in the database 400 to the storage unit 201 (S710). Then, the step S710 goes to the step END in which the encryption process ends (END).

If the file selecting unit 203 judges that the item data portions belong to the thus set table data portions, the step S704 goes forward to the step S705 in which the encryption item selecting unit 204 is operated to judge on whether or not the item data portions belong to item data portions appropriately set on the basis of the encryption setting data portion 220 (S705). If the encryption item selecting unit 204 judges that the item data portions do not belong to the thus set item data portions, the step S705 goes straight S710 in which the item encryption unit 207 is operated to pass the item data portions to be written in the database 400 to the storage unit 201 (S710). Then, the step S710 goes to the step END in which the encryption process ends (END).

If the encryption item selecting unit 204 judges that the item data portions belong to the thus set item data portions, the step S705 goes straight S706 in which the item encryption unit 207 is operated to judge on whether or not item data portions to be written in the database 400 have already been encrypted (S706). This means that the encryption item selecting unit 204 is operated to judge on whether or not the item data portions belong to the encrypted item data group with all of item data elements encrypted or not. If the item encryption unit 207 judges that the item data portions to be written in the database 400 have not yet been encrypted, i.e., the item encryption unit 207 judges that item data portions belong to the non-encrypted item data group with all of the item data elements not encrypted, the step S706 goes forward to the step S707 in which the item encryption unit 207 is operated to encrypt all of the item data elements in the item data portions to be written in the database 400 with a secret key selected by the secret key selecting unit 206 (S707). Then, the step S707 goes forward to the S708. If the item encryption unit 207 judges that the item data portions to be written in the database 400 have already been encrypted, i.e., the item encryption unit 207 judges that the item data portions belong to the encrypted item data group, the step S707 of encrypting all of item data elements in the item data portions is skipped. This means that the step S706 goes straight to the step S708.

In the step S708, the item compression unit 208 is operated to judge on whether or not thus encrypted item data elements in the encrypted item data portions are to be compressed (S708). If the item compression unit 208 judges that the encrypted item data elements in the item data portions are to be compressed, the step S708 goes forward to the step S709 in which the item compression unit 208 is operated to compress all of the encrypted item data elements in the item data portions (S709). The step S709 goes forward to the step S710. If the item compression unit 208 judges that the encrypted item data elements in the item data portions are not to be compressed, the step S709 of compressing all of the encrypted item data elements in the item data portions is skipped. This means that the step S708 goes straight to the step S710.

In the step S710, the item encryption unit 207 is operated to pass the item data portions to be written in the database 400 to the storage unit 201 (S710). The step S701 goes forward to step END in which the encryption process ends (END).

Referring now to FIG. 21, the decryption process performed by the decryption apparatus 300 of the embodiment according to the present invention will be described hereinlater.

In the step S800, the decryption apparatus 300 is operated to obtain the setting information data elements and the secret key to be used for the decryption process, from the decryption setting data portion 320 decrypted in the memory unit 108 (S800). The step S800 goes forward to the step S801 in which the reading unit 302 is operated to pass item data portions with all of item data elements to be read from the database 400 to the item decryption unit 305, in specified association with one item name portion (S801).

The step S801 goes forward to the step S802 in which the item decryption unit 305 is operated to receive the item data portions with all of item data elements to be read from the database 400 (S802). The step S802 goes forward to the step S803 in which the item decryption unit 305 is operated to judge on whether or not the item data portions are to be read by the reading unit 302 of the business program 310 appropriately set on the basis of the decryption setting data portion 320 (S803). If the item decryption unit 305 judges that the item data portions are not to be read by the reading unit 302 of the thus set business program 310, the item decryption unit 305 judges that the item data portions are illegal item data portions made by an unauthorized business program and the step S803 goes forward to the step END in which the decryption process ends (END).

If the item decryption unit 305 judges that the item data portions are to be read by the reading unit 302 of the thus set business program 310, the step S803 goes forward to the step S804 in which the decryption item selecting unit 303 is operated to judge on whether or not the item data portions belong to table data portions appropriately set on the basis of the decryption setting data portion 320 (804). If the decryption item selecting unit 303 judges that the item data portions do not belong to the thus set table data portions, the step S804 goes straight to the step S810 in which the item decryption unit 305 is operated to pass the item data portions to be read from the database 400 to the reading unit 302 (S810). Then, the step S810 goes to the step END in which the decryption process ends (END).

If the decryption item selecting unit 303 judges that the item data portions belong to the thus set table data portions, the step S804 goes forward to the step S805 in which the decryption item selecting unit 303 is operated to judge on whether or not the item data portions belong to item data portions appropriately set on the basis of the basis of the decryption setting data portion 320 (S805). If the decryption item selecting unit 303 judges that the item data portions do not belong to the thus set item data portions, the step S805 goes straight to the step S810 in which the item decryption unit 305 is operated to pass the item data portions to be read from the database 400 to the reading unit 302 (S810). Then, the step S810 goes to the step END in which the decryption process ends END).

If the decryption item selecting unit 303 judges that the item data portions belong to the thus set item data portions, the step S805 goes forward to the step S806 in which item decompression unit 306 is operated to judge on whether or not item data elements in the item data portions to be read have been compressed (S806). If the item decompression unit 306 judges that the item data elements in the item data portions have been compressed, the step S806 goes forward to the S807 in which the item decompression unit 306 is operated to decompress the item data elements in the item data portions to be read (S807). If the item decompression unit 306 judges that the item data elements in the item data portions have not been compressed, the step 807 of decompressing all of the item data elements in the item data portion is skipped. This means that the step S806 goes straight to the step S808.

In the step S808, the item decryption unit 305 is operated to judge on whether or not the item data elements in the item data portions to be read have been decrypted. If the item decryption unit 305 judges that the item data elements in the item data portions have not been decrypted, the item decryption unit 305 is operated to decrypt all of the item data elements in the item data portions to be read with the secret key selected by the secret key selecting unit 304 (S809). If the item decryption unit 305 judges that the item data elements in the item data portions have been decrypted, the step S809 of decrypting all of the item data elements in the item data portions is skipped. This means that the step S808 goes directly to the step S810.

In the step S810, the item decryption unit 305 is operated to pass the item data portion to be read from the database 400 to the reading unit 302 (S810). The step S810 goes forward to the step END in which the decryption process ends (END).

As described hereinbefore, the encryption and decryption apparatuses, methods and computer program products of the embodiment according to the present invention can encrypt all of item data elements in item data portions to be written to the database 400 in specified association with an item name portion, and decrypt all of item data elements in item data portions to be read from the database 400 in specified association with an item name portion. This means that item data elements in item data portions can be effectively encrypted and decrypted when, for instance, item data elements in item data portions are updated in specified association with a specific item name portion.

As described hereinbefore, the present invention provides encryption and decryption apparatuses, methods and computer program products make it possible to selectively encrypt and decrypt a part of a file portion being handled on a computer. Particularly, the encryption and decryption apparatuses, methods and computer program products according to the present invention can encrypt and decrypt item data elements in item data portions in specified association with an item name portion.

Furthermore, the encryption and decryption apparatuses, methods, and computer program products of the embodiment according to the present invention can encrypt and decrypt item data elements in item data portions in specified association with an item name portion, thereby making it possible to selectively encrypt item data elements in item data portions in specified association with a specific important item name portion only. This leads to the fact that the confidentiality of the important item data portions will be protected against unauthorized use and tampering even if the item data portions are stolen.

Furthermore, the encryption and decryption apparatuses, methods and computer program products of the embodiment according to the present invention can encrypt and decrypt all of item data elements in item data portions in specified association with a specific item name portion of a database while maintaining reciprocal relationships among the item data portions in the database regardless of whether item data elements in the item data portions are encrypted or not. This leads to the fact that major features of the database such as data search and data realignment functions, remain enabled even if item data elements in item data portions of the database are encrypted.

The encryption and decryption apparatuses, methods and computer program products of the embodiment according to the present invention can encrypt and decrypt all of item data elements in item data portions in specified association with a specific item name portion of a database. This means that the encryption and decryption apparatuses, methods and computer program products of the embodiment according to the present invention can encrypt and decrypt only a part of the database, thereby making it possible to reduce a processing time required for encrypting and decrypting the database.

Moreover, the encryption and decryption apparatuses, methods and computer program products of the embodiment according to the present invention stores the encrypted encryption and decryption setting information including encrypted item data elements in the hard disk as well as stores and utilizes the non-encrypted encryption and decryption setting information including non-encrypted item data elements in the memory unit. It is quite difficult to steal item data elements from the memory unit. This leads to the fact that the encryption and decryption setting information data elements are protected from leakage.

The encryption and decryption apparatuses, methods and computer program products of the embodiment according to the present invention can process the encryption and decryption setting information and item data portions of the database 400 separately. This leads to the fact that item data elements in item data portions of the database can be encrypted and decrypted separately in specified association with a specific item name portion, thereby making it possible to enhance flexibility in database design.

As described hereinbefore, the encryption and decryption apparatuses, methods and computer program products of the embodiment according to the present invention can encrypt and decrypt all of item data elements in item data portions in specified association with a specific item name portion. This means that item data elements in item data portions can be effectively encrypted and decrypted when, for instance, item data elements in item data portions are updated in specified association with a specific item name portion.

It will be understood by those skilled in the art that the foregoing description is in terms of the preferred embodiments of the present invention wherein various changes and modifications may be made without departing from the spirit and scope of the invention, as set forth in the appended claims.

What is claimed is:

1. A method for generating a partially encrypted and compressed database having at least one table composed of a plurality of item name portions and a plurality of item data portions in a multi-dimensional database management system designed to operate with a plurality of a multi-dimensional table databases having a plurality of columns and a plurality of rows, said method comprising the steps of:
   generating encryption setting information identifying where encryption will be performed in particular columns and/or rows of the multi-dimensional table databases;
   receiving item data elements for writing into corresponding pre-selected item data portions of said at least one table;
   judging which of said plurality of item data portions require encryption using the encryption setting information;
   determining which said item data elements are in said plurality of item data portions which require encryption;
   generating and choosing a key for encrypting said item data elements in item data portions selected for encryption;
   encrypting said item data elements in said plurality of item data portions with said key thereby generating encrypted item data elements;
   selecting which of said encrypted item data elements to compress;
   compressing the selected encrypted item data elements thereby generating encrypted and compressed item data elements; and
   providing said encrypted and compressed item data elements in said at least one table of said partially encrypted and compressed database.

2. A method for decrypting a partially encrypted and compressed database having at least one table composed of a plurality of item name portions and a plurality of item data portions in a multi-dimensional database management system designed to operate with a plurality of a multi-dimensional table databases having a plurality of columns and a plurality of rows, said method comprising the steps of:
   reading encrypted and compressed item data elements from corresponding pre-selected item data portions;
   generating decryption setting information identifying where decryption will be performed in particular columns and/or rows of the multi-dimensional table databases;
   judging which of said plurality of item data portions require decryption using said decryption setting information;
   determining which said encrypted and compressed item data elements are in said plurality of item data portions to be decrypted;
   choosing a key for decrypting said encrypted and compressed item data elements, wherein said key encrypted said encrypted and compressed item data elements;
   selected which of said encrypted and compressed item data elements to decompress:
   decompressing the selected encrypted and compressed item data elements thereby generating encrypted item data elements;
   decrypting said encrypted item data elements with said key thereby generating decrypted item data elements; and
   providing said decrypted item data elements in said plurality of item data portions in said at least one table of said partially encrypted and compressed database.

* * * * *